United States Patent Office 3,325,650
Patented June 13, 1967

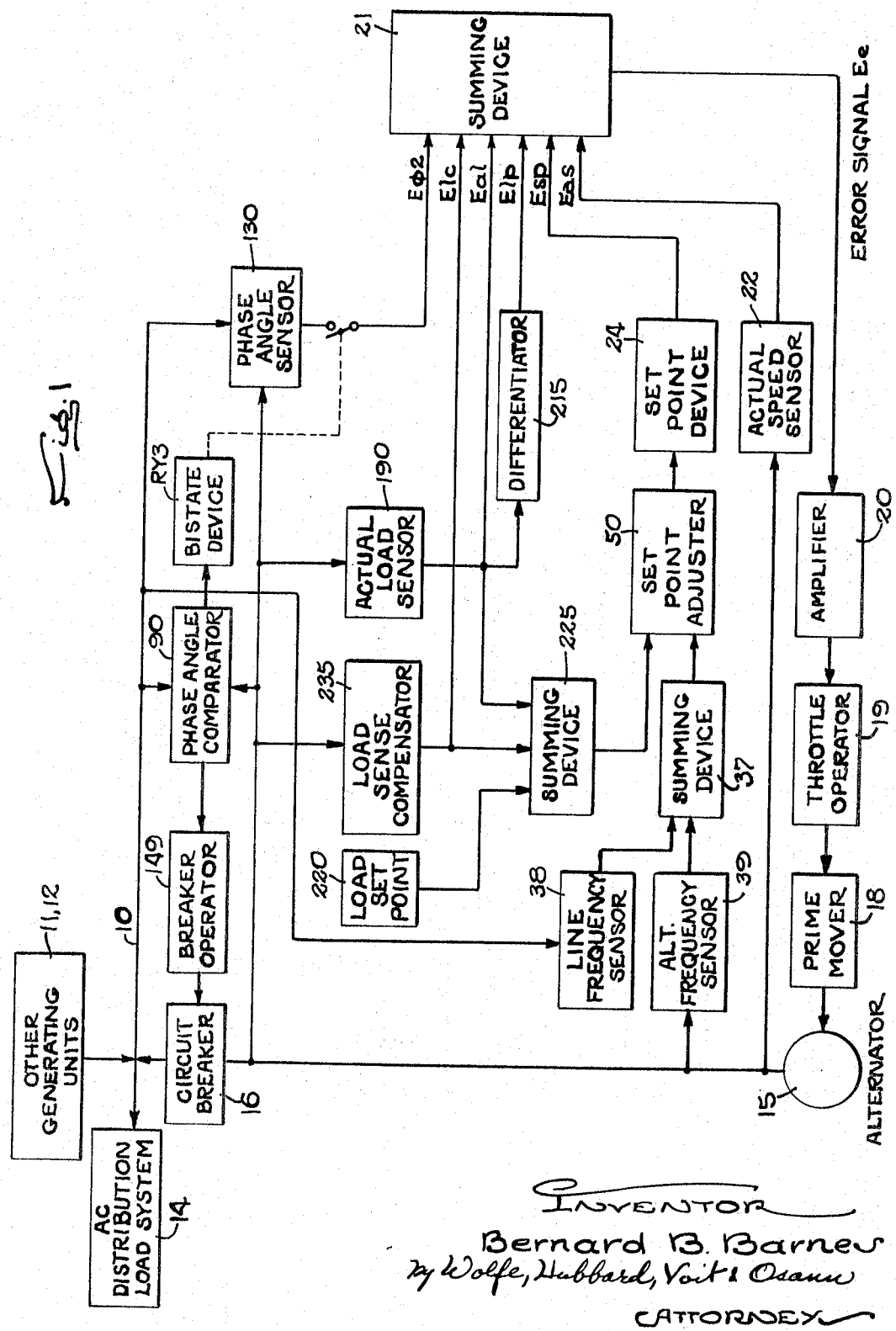

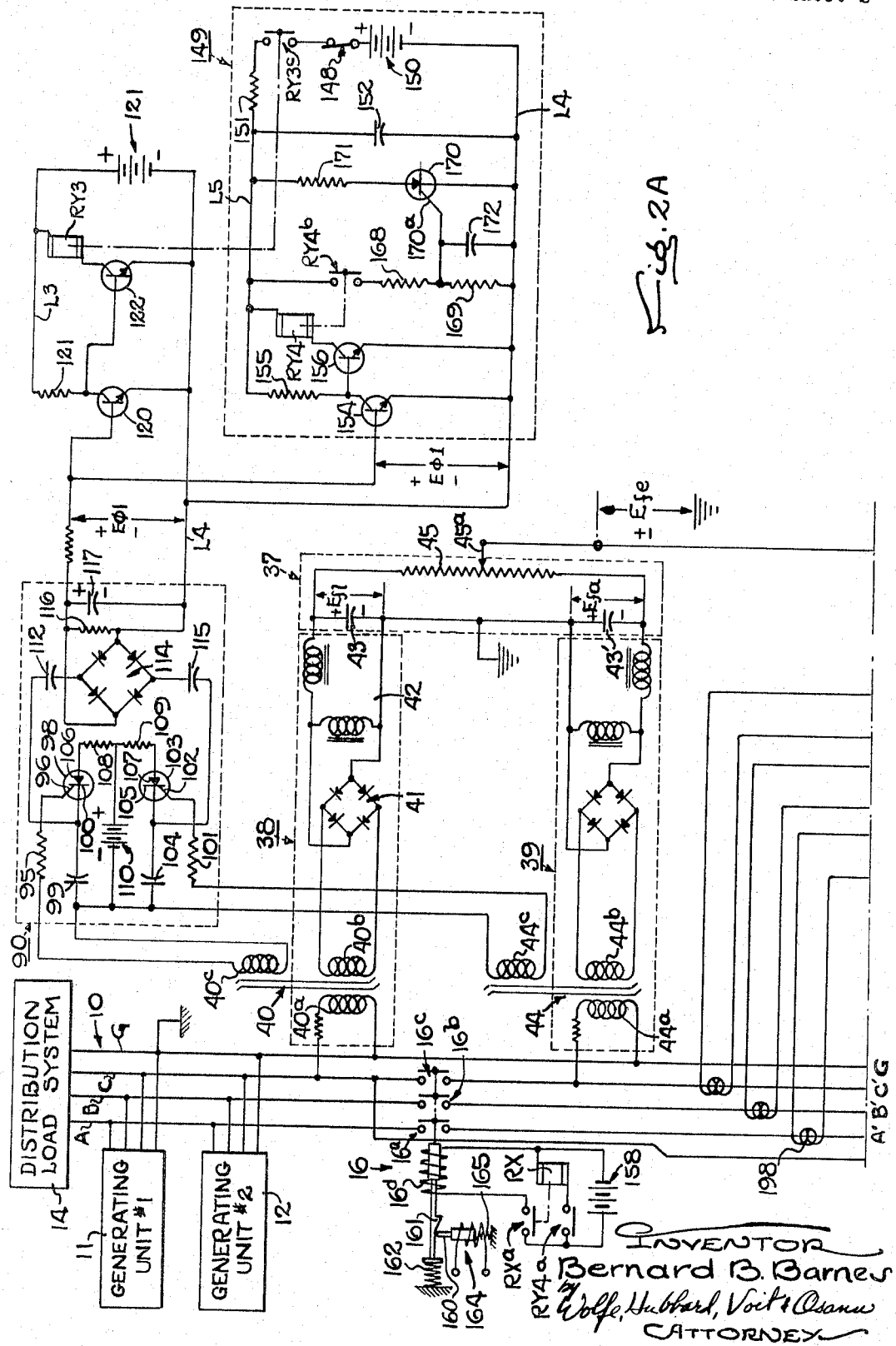

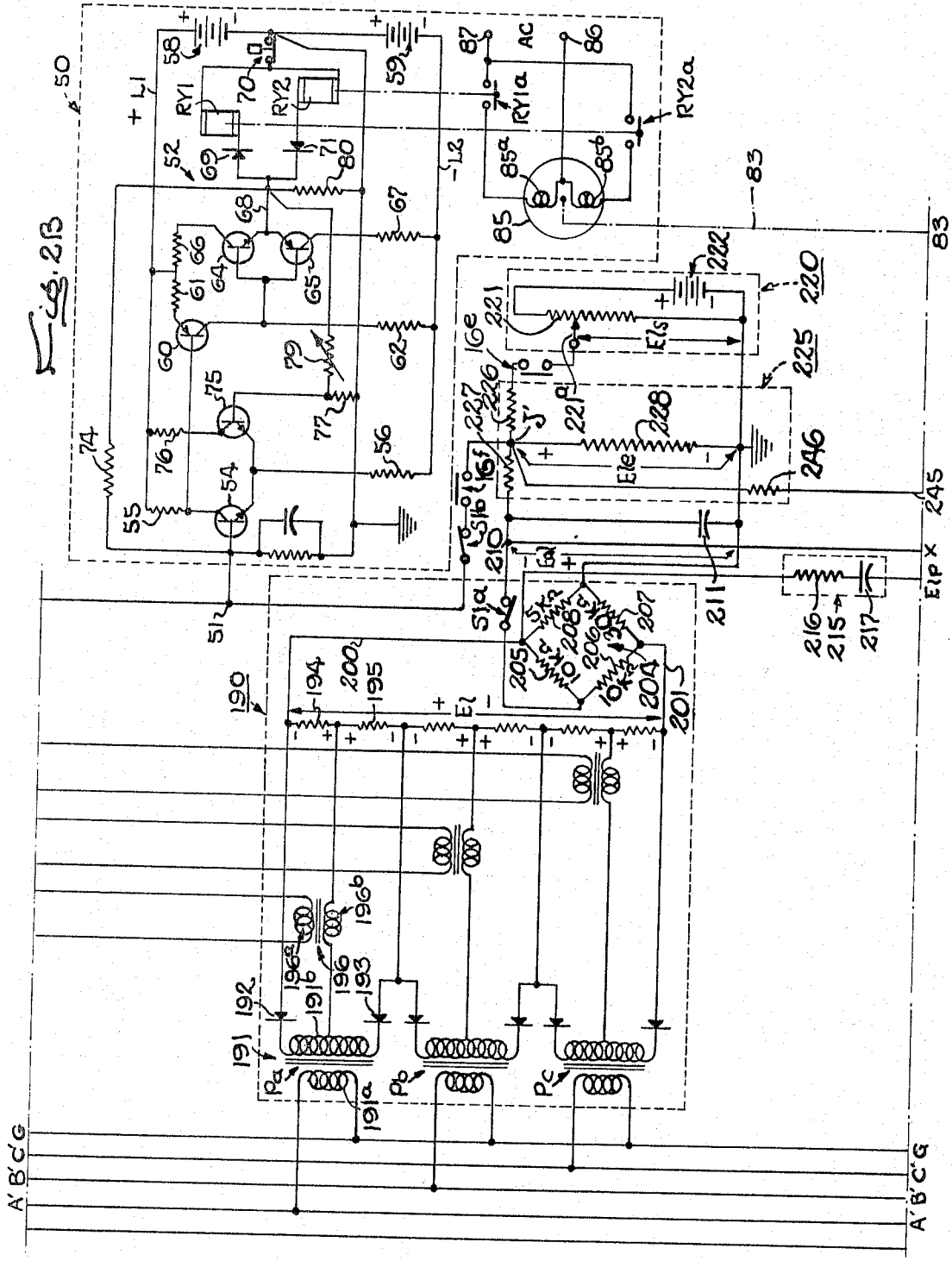

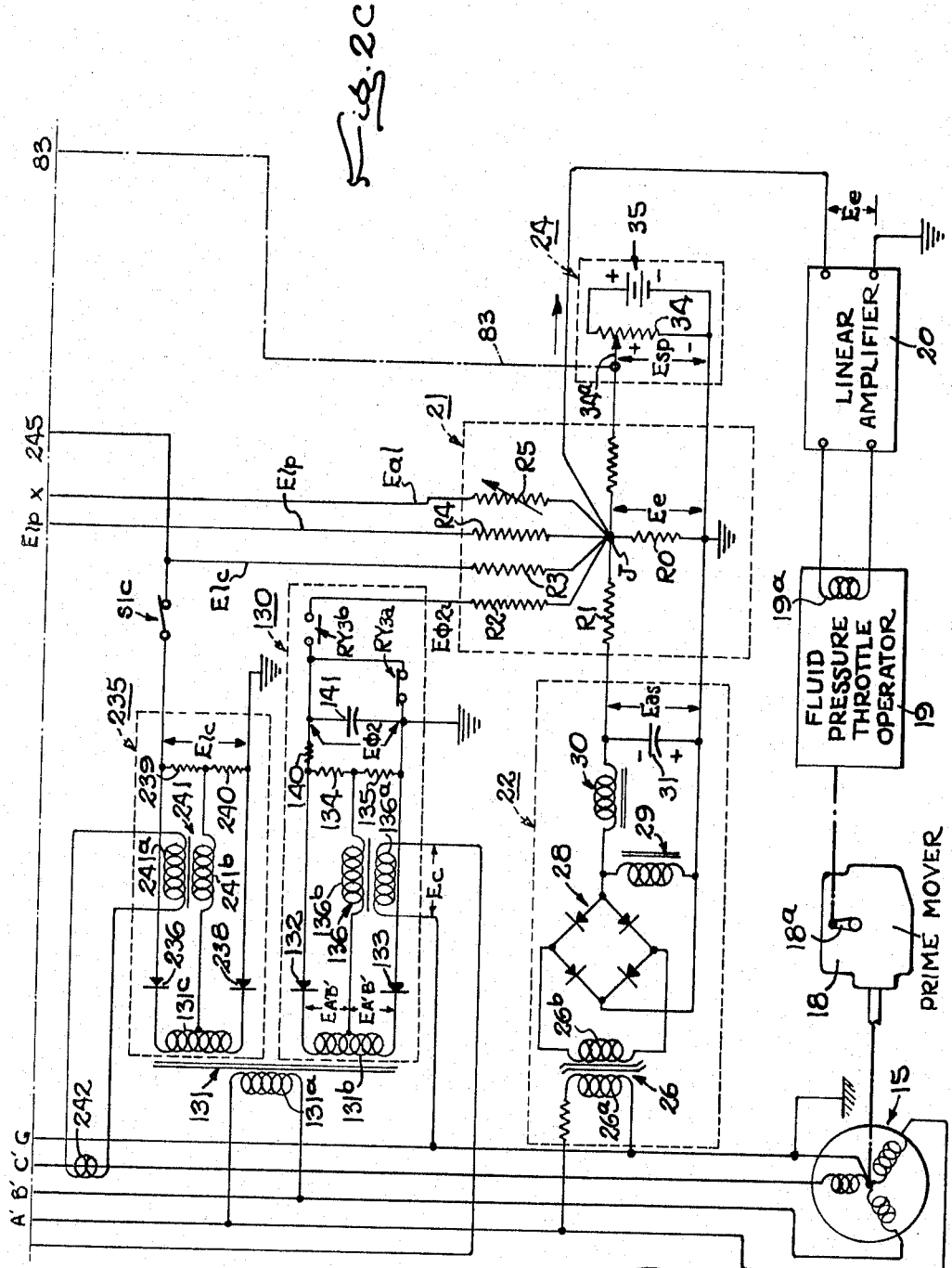

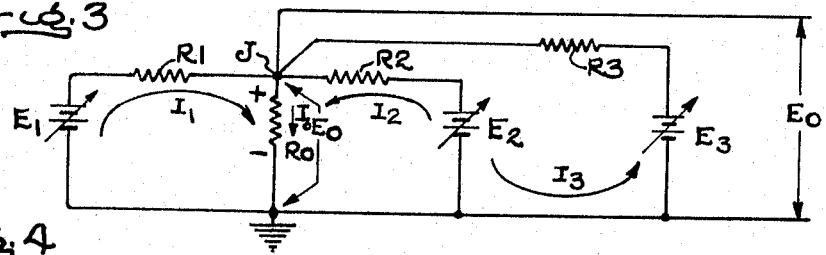
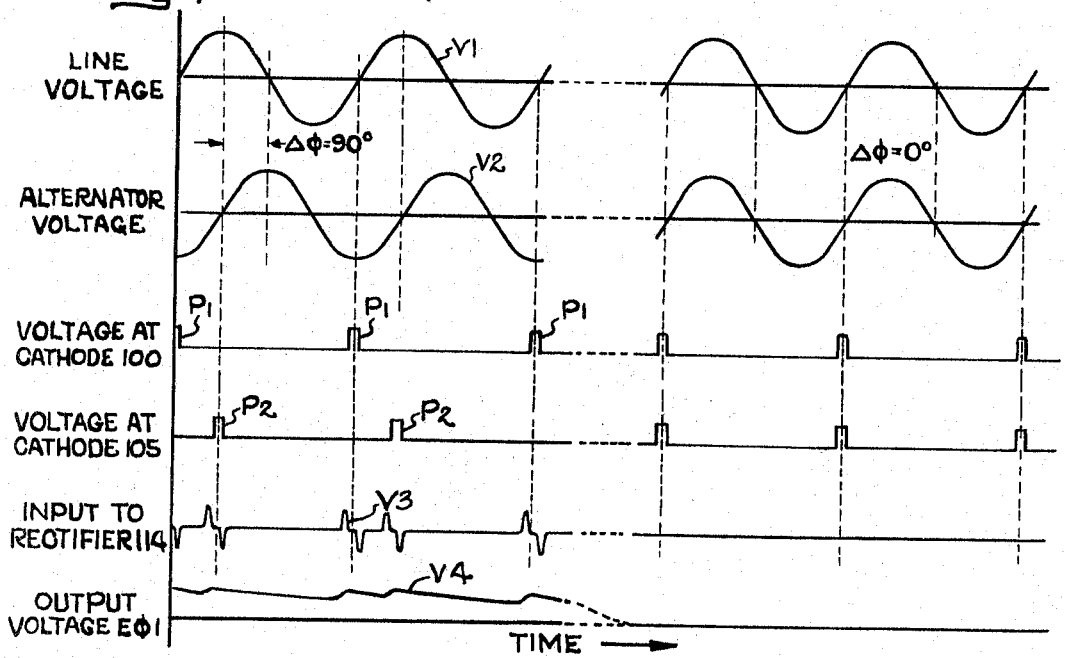
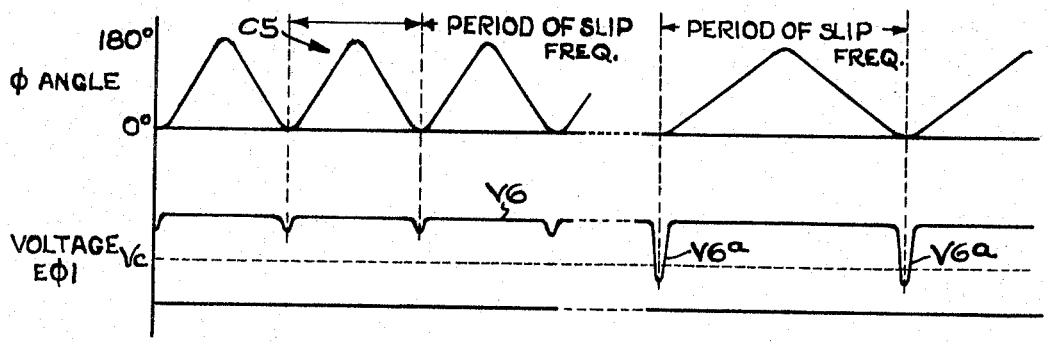

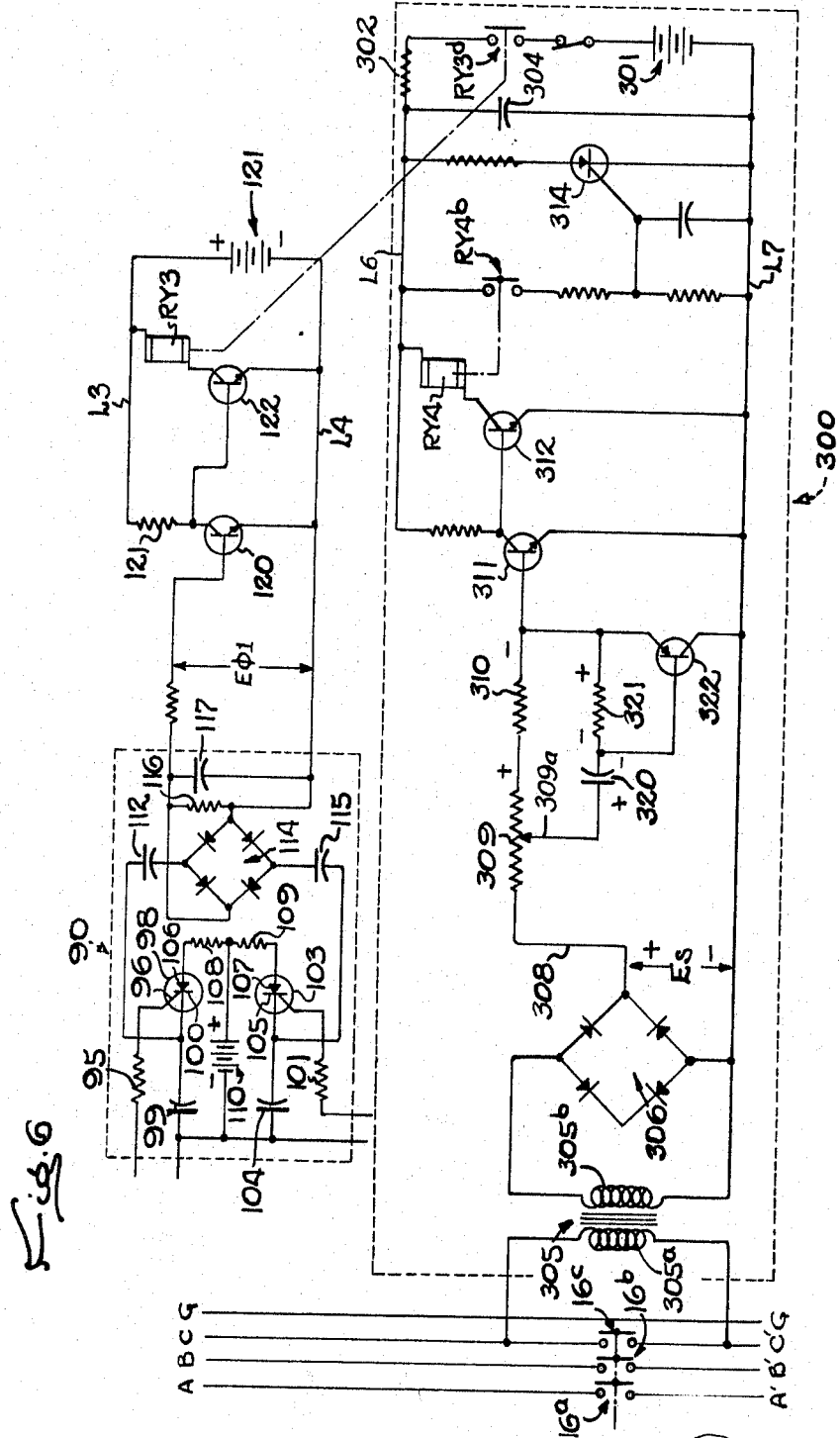

3,325,650
ALTERNATOR CONTROL SYSTEM
Bernard B. Barnes, Rockford, Ill., assignor to Woodward Governor Company, Rockford, Ill., a corporation of Illinois
Filed Apr. 22, 1964, Ser. No. 361,785
28 Claims. (Cl. 290—40)

The present invention relates in general to the control of alternating current generators and the driving prime movers therefor. More specifically, the invention is concerned with the automatic connection of alternators to an AC distribution line (or in parallel with other alternators), and with the automatic control of the power or load delevered by the alternators.

It is the general aim of the invention to provide an improved control system for an alternator which serves all necessary functions for automatically placing an alternator in service—with speed synchronization, phase matching, connection to an AC distribution line, and the delivery of a predetermined wattage load—once the driving prime mover has been started.

Another object is to provide a control system in which an alternator is automatically brought to speed and frequency synchronism with the frequency of an AC distribution line once the prime mover has been started, and even though the line frequency may have any value within a relatively wide range.

Still another object is to provide in such a system a very simplified, yet highly reliable, arrangement for connecting the alternator to the distribution line when the alternator and line voltages are substantially matched both in frequency and phase.

A related object is to provide a novel and improved circuit for sensing and signalling when the phase angle between an alternator voltage and an AC line voltage is less than a predetermined low value and has a predetermined low rate of change.

It is also an object of the invention to provide an alternator control system in which approximate matching of the phase and frequency of an alternator voltage and a line voltage is signalled, and in which the phase of the alternator voltage is thereafter automatically and precisely controlled and maintained in substantial agreement with that of the line voltage through the use of a closed loop servo control employing many of the same components used for alternator speed control.

An additional object of the invention is to effect connection of the alternator to the distribution line only after the automatic phase control has been rendered effective and has had sufficient time to stabilize the phase angle of the alternator voltage is substantial agreement with that of the line voltage.

Another object is to provide such a system in which the load of the alternator (that is, the power in kilowatts delivered by the alternator) is automatically brought to and maintained at a predetermined but adjustable value after the alternator is connected to the distribution line. In this connection, it is an object to effect such automatic control of the alternator load by employing substantially the same devices which operate to match the alternator and line frequencies prior to closure of the connecting circuit breaker.

Still another object is to compensate for practical inaccuracies in the operation of a conventional load sensor, thereby to make the droop and load controlling operation of the system more precise.

Finally, it is an objective here to achieve the foregoing by relatively simple and compact, yet highly reliable, electric controls which involve a minimum of moving mechanical parts and require very little maintenance attention.

Other objects and advantages will become apparent a the following description proceeds, taken in conjunctior with the accompanying drawings, in which:

FIGURE 1 is a block and line diagram generally rep resenting an alternator control system embodying the features of the present invention;

Composite FIG. 2 (constituted by FIGS. 2A, 2B and 2C which are to be joined along the indicated junction lines) is a more detailed schematic circuit diagram, partly ir block form, of an exemplary system corresponding to tha which is represented by FIG. 1;

FIG. 3 is a schematic diagram of a summing circuit and which will be helpful in understanding the operatior of similar summing circuits shown in FIG. 2;

FIGS. 4 and 5 are graphs showing the variations of certain signals and voltages, and making clearer the operation of a phase comparator employed in the system; and FIG. 6 is a schematic circuit diagram corresponding tc a portion of FIG. 2 and illustrating a modified embodiment of the present system.

While the invention has been shown and will be described in some detail with reference to particular, exemplary embodiments thereof, there is no intention that it thus be limited to such detail. On the contrary, it is intended here to cover all alterations, modifications and equivalents falling within the spirit and scope of the invention as defined by the appended claims.

The exemplary embodiment of the present alternator control system is shown by FIGS. 1 and 2 in association with an AC distribution line 10 supplied by one or more additional generating units 11, 12. This is specifically shown in FIG. 2 as a three phase distribution line 10 having three principal buses A, B, C and an auxiliary ground bus G. For purpose of the present description, it will be assumed that the distribution line 10 which feeds AC distribution load system 14 constitutes an "infinite bus" supplied by a large number of generating stations, although it is to be understood that the term "distribution line" as used herein may embrace any mono- or polyphase system to which alternating current energy is supplied by one or more alternators in addition to the one which is controlled as described below.

The alternator controlled by the illustrated system is here shown at 15 as a three phase alternator having its output lines A′, B′, C′, connectable through contacts 16a, 16b, 16c of a circuit breaker 16 to the distribution line 10. The alternator is driven by a prime mover 18 of any suitable type having an adjustable throttle 18a which controls the output speed and torque thereof. It is to be understood that the prime mover may take any of a variety of forms, e.g., a steam turbine, a water wheel turbine, a diesel engine, a gas turbine engine, or even an electric motor. In any case, the prime mover will be responsive to a throttle control signal which determines the output speed and torque.

For the purpose of controlling the prime mover and thereby control the speed or load of the alternator 15 in the embodiment here illustrated, a throttle operator 19 is employed to move the throttle according to variations in an error signal. Briefly stated, in the arrangement of FIGS. 1 and 2, an error signal Ee is generated and applied to a linear amplifier 20, the output of the latter being connected to a solenoid 19a in the throttle operator 19 so as to supply that solenoid with current which corresponds in magnitude and polarity to the error signal. The throttle operator 19 may take any one of a variety of forms well known in the art, and it functions to move the throttle 18a in an opening or closing direction when the error signal Ee is positive or negative in polarity, and at a rate of velocity which is substantially proportional to the magnitude of the error signal.

As an important component of the present system, a summing device 21 is employed which has a plurality of inputs, and which functions to produce an output error signal representative of the algebraic sum of the several individual input signals supplied thereto. In the present instance, the summing device 21 is constituted by a very simple resistor circuit which receives adjustable or variable voltages as its input signals, and which produces an output error voltage E$e$ which, although smaller than a true algebraic sum, is of a polarity corresponding to, and of magnitude proportional to the algebraic sum of the input voltages. It will be seen from FIG. 2 that the summing circuit 21 is constituted by an output resistor R$o$ connected between a point of reference potential (here shown as ground) and an adding junction J. Each of several input signals E$as$, E$\phi 2$, E$lc$, E$lp$, E$al$, E$sp$ is applied through one of the resistors R1 through R5 to the adding junction J, these input voltages appearing between the extremity of the associated resistor and ground.

The operation of the summing circuit 21 may be better understood by reference to the simplified example of FIG. 3 wherein three batteries are illustrated as producing three input signals E1, E2 and E3 supplied through individual resistors R1, R2 and R3 to an adding junction J, the latter being connected through an output resistor R$o$ to a common ground point. If it is assumed that three loop currents I1, I2, I3 flow in the directions indicated by the arrows in FIG. 3, and that an output current I$o$ flows through the resistor R$o$ as indicated, then the following simultaneous equations may be written from inspection:

$$E_1 - R_1 I_1 - E_0 = 0 \quad (1)$$
$$E_2 - R_2 I_2 - E_0 = 0 \quad (2)$$
$$E_3 - R_3 I_3 - E_0 = 0 \quad (3)$$
$$E_0 = R_0 I_0 \quad (4)$$
$$I_1 + I_2 + I_3 = I_0 \quad (5)$$

By solving Equations 1 to 4 for the values of the respective currents, and substituting those values into Equation 5, the following relationship is obtained:

$$E_0 = \frac{E_1(R_2 R_3 R_0) + E_2(R_1 R_3 R_0) + E_3(R_1 R_2 R_0)}{R_1 R_2 R_3 + R_1 R_2 R_0 + R_1 R_3 R_0 + R_2 R_3 R_0} \quad (6)$$

Recognizing that the values of the several resistors appearing in Equation 6 remain constant, the expression may be simplified into the following expression wherein the several $k$ symbols represent constants:

$$E_0 = \frac{k_1 E_1 + k_2 E_2 + k_3 E_3}{k_4} \quad (7)$$

Indeed, if it is assumed merely by way of example that all of the resistors R1, R2, R3 and R$o$ have a value of 10 ohms, then Equation 6 may be rewritten in the simplified form:

$$E_0 = \frac{E_1 + E_2 + E_3}{4} \quad (8)$$

Thus, it may be seen from Equation 6 or 8 that the resistor summing circuit shown at 21 in FIG. 2 (and represented by a simplified example in FIG. 3) operates to produce an output voltage E$o$ (that is, the error voltage E$e$ in FIG. 2) which corresponds in polarity to the algebraic sum of the several input voltages, and which is a proportional fraction of the algebraic sum of the several input voltages.

In carrying out the present invention, means are provided to produce a speed voltage signal which by its magnitude is representative of the actual speed of the alternator 15. This function is served by a speed sensor 22 (FIG. 1) which is shown in greater detail by FIG. 2. The speed sensor 22 includes a saturating pulse transformer 26 having its primary winding 26$a$ energized with the alternating output voltage of one phase of the alternator 15. The secondary winding 26$b$ thus has induced therein short voltage pulses at each zero crossing of the alternator voltage, and the frequency of these pulses is the same as the frequency of the alternator output voltage, the latter in turn being directly proportional to alternator speed. Due to the saturating characteristic of the transfer 26, the voltage pulses induced in the secondary winding 26$b$ are substantially constant in area. Thus, the average or DC value of these pulses is directly proportional to alternator speed. To derive a variable DC voltage representative of such average, the secondary winding of 26$b$ is connected to the input of a full wave rectifier 28, the output of the latter being applied to parallel and series filtering inductances 29, 30 and thence to a smoothing capacitor 31. Therefore, a variable DC signal or voltage E$as$ which is proportional to the actual speed of the alternator 15 appears with the indicated polarity across the capacitor 31. This actual speed voltage E$as$ is applied as one input signal to the summing circuit 21.

In order to produce a set point signal or voltage E$sp$ which is adjustable in its magnitude, any one of a variety of adjustable devices may be utilized. As shown in FIG. 2, an adjustable set point device 24 takes the form of a potentiometer 34 energized from a suitable voltage source, here shown as a battery 35. The movable wiper 34$a$ of the potentiometer thus receives a voltage E$sp$ which is positive with respect to ground and of a magnitude determined by the adjusted position of that wiper. As shown, the set point signal voltage E$sp$ of the indicated polarity is applied as a second input signal to the summing circuit 21.

If the circuit breaker 16 is open so that the alternator is disconnected from the distribution line 10, then the speed of the prime mover 18 and the alternator 15 will be automatically controlled so as to agree with a set point value represented by the position of the wiper 34$a$ and the magnitude of the set point voltage E$sp$. With the circuit breaker open no current can be supplied by the alternator, and its output load will be zero. Under these conditions, all of the input signals to the summing circuit 21 will be zero except the speed signal E$as$ and the set point signal E$sp$, and the error voltage E$e$ will represent the algebraic sum of those two signals. If the speed voltage E$as$ is greater or less than the set point voltage E$sp$ (indicating that the alternator speed is above or below the desired value), the error voltage E$e$ will be negative or positive. That error voltage E$e$ supplied through the linear amplifier 20 to the solenoid 19$a$ will cause the throttle 18$a$ to be moved in a closing or opening direction, and thereby to decrease or increase the speed of the alternator 15 until the error voltage is restored to and held substantially at zero.

Provision is made automatically to adjust the speed of the alternator 15 until the generated alternator frequency is brought into substantial equality with the frequency of the distribution line 10. To accomplish this, frequency sensors 38 and 39 are excited with the line and alternator voltages, respectively, and operate to produce DC signal voltages E$fl$ and E$fa$ which are respectively proportional to those frequencies. Such frequency-representing signals are applied to a summing device 37 which produces an output signal E$fe$ representative of the frequency error.

As shown in more detail by FIG. 2, the line frequency sensor 38 comprises a saturating pulse transformer 40 having its primary winding 40$a$ excited by voltage from the distribution line bus C and having its secondary winding 40$b$ connected to a full wave rectifier 41 and a smoothing filter 42 including a capacitor 43. It will be recognized that the frequency sensor 38 is substantially identical in its organization to the speed sensor 22, and the operation of these two devices is identical. Thus, it will be understood that the voltage E$fl$ appearing with the polarity indicated across the capacitor 43 is proportional in magnitude to the frequency of the alternating line voltage. Moreover, the alternator frequency sensor 39 is identical to the line frequency sensor 38, except that the saturating pulse transformer 44 in sensor 39 is excited with an input voltage from the C' output line of the alternator 15 when the circuit breaker 16 is open. Thus, the voltage $Efa$ appearing across a capacitor 43' at the output of the sensor 39 is in magnitude proportional to the generated voltage frequency of the alternator.

In order to derive a frequency error signal representative in its polarity and magnitude of the difference between the alternator and the line frequency, the two frequency signals $Efl$ and $Efa$ are algebraically added in opposing relationships by the summing circuit 37. For this purpose, the junction between capacitors 43 and 43' is connected to ground, and a balancing potentiometer 45 is connected across the two capacitors. The potentiometer wiper 45a (after a suitable balancing adjustment to compensate for any non-uniformity in the circiut components) thus receives a frequency error voltage $Efe$ which in polarity and magnitude corresponds to the sense and extent of the mismatch between the alternator and line frequencies.

Means are provided which are responsive to the frequency error signal $Efe$ produced by the summing circuit 37 for adjusting the speed of the alternator 15 until its frequency is in substantial agreement with the frequency of the distribution line 10. Such means in the present instance take the form of a set point adjustor 50 (FIG. 1). The adjustor 50 is shown in detail by FIG. 2 as comprising a polarity-sensitive transistorized amplifier 52 which controls two relays RY1 and RY2. The set point adjustor 50 responds to the frequency error signal $Efe$ when the latter is positive or negative to energize power means which drive or reset the adjustable set point device 24 in a direction to increase or decrease the speed of the prime mover 18, and thereby to correctively increase or decrease the frequency of the alternator 15 until the error signal $Efe$ is restored substantially to zero.

More specifically, the frequency error signal $Efe$ is applied to the input terminal 51 of the voltage-sensitive, transistorized amplifier 52, and thus is applied to the base of a transistor 54 having its collector connected through a load resistor 55 to a positive voltage supply line L1, and having its emitter connected through a resistor 56 to a negative voltage supply line L2. These voltage supply lines are held at potentials which are respectively positive and negative with respect to ground by suitable voltage sources here shown as batteries 58 and 59. The potential at the collector of the transistor 54 is applied to the base of a second transistor 60 which has its emitter connected through a load resistor 61 to the positive voltage line L1, and its collector connected through a load resistor 62 to the negative line L2. The amplified output signal appearing at the collector of the transistor 60 is applied to the bases of two transistors 64 and 65, the former being of the NPN type with its collector connected through a resistor 66 to the positive line L1, and the latter being of the PNP type with its collector connected through a resistor 67 to the negative line L2. The emitters of the transistors 64 and 65 are connected to a common output line 68 which is in turn connected to ground through a resistor 80. When the voltage drop across the emitter-base path of the transistor 65 and the resistor 67 equal the negative voltage on the line L2, the output terminal 68 resides at zero or ground potential. This condition obtains when the input signal $Efe$ is zero, but as the frequency error voltage $Efe$ swings positive or negative, the potential of the line 68 will swing positive or negative.

The relay RY1 has its coil connected in series with a first diode 69 and through a normally closed selector switch 70 to a point of ground potential; while the relay RY2 has its coil connected in series through a second diode 71 and the switch 70 to the point of ground potential. The diodes 69 and 71 are oppositely poled, so that the relay RY1 will be energized when the output line 68 is positive with respect to ground, whereas the relay RY2 will be energized when the output line 68 is negative with respect to ground.

In order to make the transistor amplifier 52 "snap-acting," a positive feedback connection is made through resistor 74 from the output line 68 to the input terminal 51. Moreover, for providing stabilization and adjustment in the gain of the amplifier, a negative feedback path is created. It will be observed that the emitter of the transistor 54 is joined to the emitter of an auxiliary transistor 75, so that the two have a common emitter resistor 56. The collector of the transistor 75 is returned through a resistor 76 to the positive line L1, and its base is connected through a resistor 77 to ground. A negative feedback connection is established from the output line 68 through a rheostat 79 to the base of the auxiliary transistor 75.

Let it be assumed that the error voltage $Efe$ applied to the input terminal 51 is initially at zero volts, but suddenly swings positive in potential due to the frequency of the alternator being lower than the frequency of the distribution line. As the base of the transistor 54 thus becomes more positive, current flow through the load resistor 55 increases, and the potential of the base of transistor 60 decreases, thereby increasing emitter-collector current flow through the latter transistor. This increases the voltage drop across the resistor 62, and causes the potential of the two bases of the transistor 64, 65 to increase. As a result, the transistor 64 is made more conductive, while the transistor 65 is made less conductive, and current flow through the transistor 65 and an output resistor 80 causes the output line 68 to swing positive in potential above ground. As a result, the positive feedback resistor 74 makes the input terminal 51 become even more positive, so that the operation described is accentuated and the output line is driven more positive. However, the positive feedback is in part cancelled by the negative feedback action of the rheostat 79, which transmits the increase in the positive potential of the output line 68 to the base of transistor 75, making the latter more positive and thereby increasing the collector-emitter current of the transistor 75. This increases the potential drop across resistor 56, so as to slightly decrease the base-emitter bias of the transistor 54.

Thus, when the input voltage $Efe$ swings positive, the voltage at the output line 68 swings abruptly positive, and the diode 69 becomes conductive so that the relay RY1 is energized.

On the other hand, if the frequency error voltage $Efe$ should become negative in polarity, indicating that the frequency of the alternator is greater than the frequency of the distribution line voltage, then the conduction of transistor 54 is decreased, the conduction of the transistor 60 is decreased. The positive and negative feedback paths produce the same action previously described, but in the opposite sense. Accordingly, when the frequency error voltage $Efe$ becomes slightly negative, the output line 68 swings strongly negative in potential so that the diode 69 is non-conductive, and the diode 71 becomes conductive so that the relay RY2 is energized. In summary, therefore, as the frequency error voltage swings positive or negative in potential relative to ground (indicating that the alternator frequency is below or above the line voltage frequency), the relay RY1 or the relay RY2 will be picked up; and when the frequency error voltage $Efe$ is substantially zero (indicating that the two frequencies are substantially matched), then both of the relays RY1 and RY2 will be deactuated.

The power means for adjusting the speed setting device 24 are here shown as comprising a reversible motor 85 having forward and reverse windings 85a, 85b, and with its rotor coupled to the wiper 34a as indicated at 83. One end of each motor winding is connected to a common terminal 86 of an A.C. voltage source, whereas the opposite ends of these windings are respectively connected through normally open contacts RY1a and RY2a (controlled by the relays RY1 and RY2) to the opposite terminal 87 of the A.C. voltage source. When the relay contacts RY1a are closed, the motor winding 85a is thus excited and the motor 85 runs in a forward direction to move the potentiometer wiper 34a upwardly, and thereby to increase the speed setting signal E$sp$. On the other hand, when the relay contacts RY2a are closed, the reverse winding 85b of the motor is excited, and the motor turns in the opposite direction to drive the potentiometer wiper 34a downwardly, and thus to decrease the speed setting voltage E$sp$.

When the prime mover 18 is started up, and with the circuit breaker 16 open so that the alternator 15 is disconnected from the distribution line 10, the alternator and line frequencies are sensed and compared in the summing circuit 37 to produce a frequency error voltage E$fe$. If the frequency error voltage is positive or negative in polarity indicating that the speed and frequency of the alternator are too low or too high, either the relay RY1 or the relay RY2 will be actuated, and the motor 85 will be energized to move the wiper 34a in a direction to increase or decrease the set point signal E$sp$. When the latter increases or decreases, the error voltage E$e$ becomes more positive or more negative, as previously explained, and thus the amplifier 20 and the throttle operator 19 act to open or close the throttle 18a until the speed of the alternator 15 is brought to a value which makes the alternator and line frequencies substantially equal. By this closed loop control which is effective when the alternator 15 is disconnected from the distribution line, the frequency of the alternator is not only brought up to the value of the frequency of the distribution line, but it is automatically corrected and maintained at that value even if the distribution line frequency should have other than a normal value or should undergo variations.

The switch 70 which is shown in FIG. 2 as a normally closed, manually operated selector switch is provided solely for the purpose of disabling the automatic frequency matching system so that it is possible, if desired, to manually adjust the position of the potentiometer wiper 34a and the set point signal E$sp$ created thereby. If for any reason it is desired to manually set this wiper without the motor 85 controlling its position, the switch 70 is simply moved to an open position so that neither of the relays RY1 or RY2 can be actuated, and the motor 85 cannot be energized.

Once the alternator has been brought up to speed and its frequency is substantially matched to that of the distribution line 10, it is desirable to close the circuit breaker 16 so that its contacts 16a, 16b, and 16c connect the alternator output lines to the corresponding lines of the three phase distribution system. However, such closure of the circuit breaker contacts must, for minimum transient disturbances, occur only at an instant when the generated alternated voltage is substantially matched in phase to the phase of the line voltage. If the frequencies of the alternator and the line voltages are slightly different, the two voltages will continuously change in relative phase, passing through phase agreement at a "slip" frequency which is equal to the difference in the alternator and line frequencies.

In accordance with another feature of the present invention, means are provided to sense when the relative phase angle between the alternator and distribution line voltages decreases to a predetermined low value and has a predetermined low rate of change. As here shown, a phase angle comparator 90 is provided to produce this signalling action, this comparator being characterized by its simplicity in organization and accuracy in operation. Referring to FIG. 2, the phase angle comparator 90 has two inputs respectively excited from secondary windings 40c and 44c of the saturating pulse transformers 40 and 44, these transformers having their primary windings connected to receive the line voltage and alternator voltage, respectively. Thus, the transformer secondary windings 40c, 44c have induced in them pulses of substantially constant width and amplitude each time that the voltage applied to the corresponding primary winding passes through zero. The secondary winding 40c has its opposite ends respectively connected through a resistor 95 to the gate 96 of a silicon controlled rectifier 98, and through a capacitor 99 to the cathode 100 of that rectifier. Similarly one end of the secondary winding 44c is connected through a resistor 101 to the gate 102 of a silicon controlled rectifier 103, and the opposite end of that secondary winding being connected through a capacitor 104 to the cathode 105 of that rectifier. The anodes 106 and 107 of the rectifiers 98 and 103 are connected through respective resistors 108 and 109 to the positive terminal of a suitable voltage source, here shown as a battery 110, the negative terminal of that source being connected to the terminals of the capacitors 99, 104 which are remote from the rectifier cathodes.

Each time that a positive-going pulse is produced in the secondary winding 40c, the controlled rectifier 98 is turned on, and current will flow from the battery 110 through the resistor 108 so that the capacitor 99 is quickly charged to a voltage substantially equal to the voltage of the battery 110. As a result of this charging of the capacitor 99, the silicon controlled rectifier 98 is turned off. Shortly it is turned on, and its cathode rises abruptly but only momentarily in potential. That is, a positive-going voltage pulse appears at the cathode 100 each time that a positive-going pulse is induced in the winding 40c. Similarly, each time that a positive pulse is induced in a secondary winding 44c, the gate 102 of the rectifier 103 is made momentarily positive, so that the rectifier 107 is turned on and current flows from source 110 through the resistor 109 until the capacitor 104 is charged to reduce the anode-cathode potential to zero. Thus, the cathode 105 of the silicon controlled rectifier 107 receives a positive-going voltage pulse. Those negative polarity pulses induced in the secondary windings 40c and 44c which tend to make the gates 96 and 102 negative relative to the cathodes 100 and 105 produce no effect on the silicon controlled rectifier circuit.

The cathode of the rectifier 98 is connected through a capacitor 112 to one input terminal of a full wave rectifier 114, while the cathode of the silicon controlled rectifier 103 is connected through a capacitor 115 to the other input of this rectifier. The output of the rectifier is connected across a smoothing filter formed by a resistor 116 paralleled with a capacitor 117.

For an understanding of the operation of the comparator 90, let it be assumed that the distribution line voltage and the alternator line voltage are about 90° out of phase (curves V1 and V2 in FIG. 4) so that positive voltage pulses (P1 and P2 in FIG. 4) non-synchronized in time appear successively at the cathodes 100 and 105. These pulses are respectively differentiated by the capacitors 112, 115 and applied to the opposite input terminals of the rectifier 114, so that the input of the latter takes the form shown at V3 in FIG. 4. The rectifier does not respond to the negative-going spikes but it does respond to each positive-going spike, so long as the pulses P1, P2 (and the positive spikes produced thereby) are not time coincident. The rectifier output thus causes the capacitor 117 to charge up to a voltage (curve V4 in FIG. 4), labeled in FIG. 2 as a first phase signal E$\phi$1, which in magnitude corresponds to the average value of the positive voltage spikes. As the line and alternator voltages approach phase agreement (curves V1 and V2 in right portion of FIG. 4), then the pulses P1 and P2 become coincident. The pulses applied to the opposite inputs of the rectifier 114 thus cancel one another, and the effective input to the latter becomes zero. Under these conditions, the capacitor 117 discharges through the resistor 116 so that the voltage E$\phi$1 drops to a relatively low value, e.g. to zero volts, as shown by curve V4 in the right portion of FIG. 4.

It is important to observe that this drop in the phase signal Eφ1 will not occur if the phase angle between the line and alternator voltages passes through zero degrees with a high rate of change (i.e., if the slip frequency is appreciable) because under these circumstances the capacitor 117 does not have time to discharge before receiving the next pulse of current from the rectifier 114. As shown in FIG. 5, when the slip frequency is fairly high so that the phase angle (curve C5) is changing rapidly, the voltage Eφ1 (curve V6) drops only slightly as the phase angle passes through zero. However, when the slip frequency is low (right portion of FIG. 5), then the voltage Eφ1 drops abruptly as at V6a below a critical voltage level Vc necessary to actuate a bi-state device as described below.

In summary, therefore, the phase comparator circuit 90 operates to produce a first phase voltage Eφ1 which is relatively large in magnitude and which only drops appreciably in value when the phase angle between the alternator and line voltages closely approaches zero and with a predetermined low rate of change. Thus, no matter how often the alternator and line voltages may "lap" through a zero degree phase angle, the first phase signal Eφ1 will remain relatively large until the phase angle reaches approximately zero degrees with a slow rate of change indicative of the fact that the alternator and line frequencies are substantially equal. By way of example, the phase comparator 90 as shown in FIG. 2 has been constructed such that the first phase signal Eφ1 does not drop appreciably in value unless the alternator and line voltages separated in phase by less than +30°, and unless they are not separated by more than 0.2 cycle per second in frequency.

In keeping with the present invention, a bi-state device is made responsive to the first phase signal Eφ1 and set when the latter indicates that the line and alternator voltages have a reltaive phase angle of a predetermined low value and a predetermined low rate of change of that phase angle. As here shown, the first phase signal Eφ1 is applied between the base and emitter of a transistor 120 which has its collector connected through a resistor 121 to a positive voltage supply line L3 and its emitter connected to a negative voltage supply line L4. The supply voltage connected to these lines is here illustrated as a battery 121. So long as the first phase voltage Eφ1 is above a predetermined definite value, the transistor 120 is rendered conductive, and the potential at its collector is relatively low. The collector of transistor 120 is connected to the base of a transistor 122, the latter having its emitter connected to the line L4 and its collector connected through the coil of a relay RY3, to the positive line L3. Since the transistor 120 is normally conductive, the transistor 122 is normally nonconductive, and the relay RY3 is normally deenergized. When, however, the first phase signal Eφ1 drops below a critical voltage (see voltage level Vc in FIG. 5), the transistor 120 is substantially cut off, the base-emitter voltage for the transistor 22 is raised sufficiently to permit collector-emitter current flow through that transistor, and the relay RY3 is actuated. The purpose and function of this selective energization of the relay RY3 will be made clear as the description proceeds. It will be clear from the foregoing, however, that the relay RY3 is a bi-state device (i.e., it is either deactuated or actuated) which is responsive to the first phase signal Eφ1 and actuated only so long as the latter indicates that the phase angle between the alternator and line voltages is less than the predetermined value and has less than a predetermined low rate of change. It will be apparent, also that as the motor 85 changes the set point device 24 to correctively adjust the speed of the alternator 15 and to bring the alternator and line voltages into substantial frequency agreement, the phase comparator 90 will automatically sense when the two voltages have approximately the same frequency value and are approximately matched in phase. When this occurs, a bi-state device will be set, i.e., the relay RY3 will be actuated.

Further in keeping with the present invention, means are provided to produce a second phase signal which by its polarity and magnitude corresponds to the sense and extent of the phase angle between the alternator and line voltages. Such means are here shown as a phase angle sensor 130 having its two inputs respectively excited with the alternator output voltage and the distribution line voltage. More specifically as shown in FIG. 2, the phase angle sensor 130 includes a transformer 131 having its primary winding 131a connected across the A' and B' lines of the alternator 15, that transformer having a center tapped secondary winding 131b. The opposite extremities of this secondary winding are connected through similarly poled diodes 132, 133 to the opposite ends of resistors 134, 135. The center tap of the secondary winding 131b is connected through the secondary winding 136b of a transformer 136 to the junction of the resistors 134 and 135. The primary winding 136a of the transformer 136 is excited with the voltage which appears between the C bus and ground in the distribution line 10. Recalling that the voltage appearing on the distribution buses A, B, C may be represented by three vectors spaced at 120° and that the alternator voltages appearing on the lines A', B' and C' may be similarly represented by three vectors spaced at 120°, then if the alternator and distribution line voltages are precisely in phase agreement, the vector for the voltage appearing on the C bus (and applied to the primary winding 136a) will lie at a 90° angle relative to the vector which represents the voltage between the alternator lines A' and B'. Thus, with a zero phase angle, the voltages induced in the two halves of the center tapped secondary winding 131b will have a 90° phase separation relative to the voltage induced in the secondary winding 136b.

Under these circumstances, the voltage which appears between the opposite extremities of the resistors 134 and 135 will be zero, indicative of zero phase error, for reasons which will now be explained. It will be seen from FIG. 2 that the upper half of the phase sensing circuit causes the interphase voltage $E_{A'B'}$ to be vectorially added to the line phase voltage Ec, and the vector sum to be rectified by the rectifier 132 so that it appears as a DC voltage across the resistor 134. On the other hand, the voltage in the lower half of the center tapped secondary winding 131b is 180° out of phase with the voltage in the upper half of this secondary winding, and thus may be represented as minus $E_{A'B'}$. This latter voltage in effect, therefore, is vectorially subtracted from the voltage Ec induced in the secondary winding 136b, the vector difference being rectified by the rectifier 133 and appearing as a DC voltage across the resistor 135. Because the voltages across these two resistors 134 and 135 are opposed in polarity, the net voltage appearing between their opposite extremities is the difference between the two individual voltages. Thus, this net voltage appearing across the extremities of the resistors 134 and 135 is a DC voltage which varies as a cosine function of the angle between the voltages applied to the primary windings 131a and 136a. Because the voltages may be assumed to be substantially constant in amplitude, the output voltage of the circuit is thus zero (cosine of 90°) when the alternator and the line frequencies have a 0° relative phase angle; and the output voltage is a maximum (cosine of 0° is 1) when the two input voltages are separated by 90° phase angle. In this manner, the phase representing signal is made to vary in polarity and magnitude in proportion to the value of sin $\phi$, where $\phi$ is the phase angle between the alternator and line voltages.

It will be seen from FIG. 2 that a filtering resistor 140 and capacitor 141 are connected across the resistors 134, 135 for smoothing the DC output voltage of the phase sensor 130, the capacitor 141 being paralleled by normally closed relay contacts RY3a, and the upper end of the capacitor 141 being connected through normally open contacts RY3b and through the resistor R2 to the adding junction J in the summing circuit 21. The lower end of the capacitor 141 is connected to the point of reference potential, i.e., ground.

As stated above, the present system includes means responsive to sensing of substantial phase agreement between the alternator and line voltages, and a substantially low rate of change of the phase, for setting the bi-state device constituted by the relay RY3. In response to actuation of the relay RY3, therefore, the contacts RY3a open so that the capacitor 141 is no longer shorted, and the contacts RY3b close, so that the second phase signal, i.e., the phase error signal $E\phi2$, is transmitted through the resistor R2 to adding junction J. When this occurs, a third input signal $E\phi2$ which by its polarity and magnitude is indicative of the sense and extent of phase mismatch, is supplied to the summing circuit 21, and so the latter now produces an error voltage $Ee$ which is the algebraic sum of three signals $Eas$, $Esp$, and $E\phi2$. If the phase angle between the alternator and line voltages is significantly different than zero degrees, in a positive or negative sense, the phase error voltage $E\phi2$ will be negative or positive in polarity, and the error voltage $Ee$ will be made more negative or positive, so that the throttle 18a of the prime mover is slightly closed or opened to restore the phase error substantially to zero degrees. Thus, while the phase comparator 90 may cause the bi-stable device RY3 to be set when the phase angle is on the order of $\pm 30°$, the actuation of the relay RY3 in connecting the phase sensor 130 to the summing device 21 results in the creation of a closed loop servo which responds to the phase error between the alternator and line voltages and correctively adjusts the throttle of the prime mover 18 until the phase of the alternator 15 is reduced and maintained at a fairly low value, e.g., no greater than about $\pm 10°$. By this arrangement the phase of the alternator voltage is "locked" to the phase of the distribution line 10 before the circuit breaker 16 is closed, and will be held in substantial agreement with the phase of the distribution line even though the latter may vary somewhat due to disturbances in the distribution system. The phase comparator 90, therefore, signals when the voltages are approaching phase agreement, and it sets the bi-state device to render effective the phase servo loop. The latter then further reduces the phase angle and locks it to a very low value.

In the preferred form of the present invention, means are provided for automatically closing the circuit breaker 16 to connect the alternator 15 to the distribution line 10 only after a predetermined time delay from the instant that the bi-state device or relay RY3 is set. This is done in order that the closed loop servo established by closure of the relay contacts RY3b has adequate time to reduce and lock the relative phase angle at a very low value. After such time delay has expired, the alternator is automatically connected to the distribution line by closing the circuit breaker 16, providing that the phase and frequency match of the two voltages has in fact been maintained.

For accomplishing these functions, a breaker operator 149 includes contacts RY3c controlled by relay RY3 and which, upon closure, connect a suitable voltage source, here shown as a battery 150, through a normally closed switch 148 and a resistor 151 across positive and negative voltage supply lines L5 and L4. Connected between these voltage supply lines is a relatively large capacitor 152, which is slowly charged to the value of the voltage provided by the battery 150 in response to closure of the contacts RY3c. Thus, the resistor 151 and capacitor 152 constitute an R-C delay circuit which permits a positive voltage to appear on the supply line L5 only after a predetermined time delay (e.g., on the order of four or five seconds) after the relay RY3 is actuated. Prior to the expiration of this time delay, none of the transistors or other conductive circuits between the supply line L5, L4 can be effective.

After a positive operating potential is established on the supply line L5, then an operative circuit is established for transistor 154. The latter has its collecter connected through a load resistor 155 to the line L5, its emitter connected to the line L4, and its base connected to the base of the transistor 120. Thus, the transistor 154 receives as its controlling input voltage the first phase signal $E\phi1$, and the transistor will thus be conductive so long as that voltage is of appreciable magnitude. When the transistor 154 is conductive, its collector resides at a relatively low potential, thereby making the connected base of a transistor 156 low in potential and assuring that a relay RY4 connected from its collector to the line L5 will be deenergized. If, however, the transistor 154 is non-conductive when the operating potential is established on the line L5, then the transistor 156 will be conductive and the relay RY4 will be energized. It is important to observe that in most cases the first phase signal $E\phi1$ will have a relatively low value after the time delay created by the resistor 151 and capacitor 152 has expired. Therefore, when a positive operating voltage appears on the line L5 the relay RY4 will normally be energized immediately. However, by connecting the first phase signal $E\phi1$ as the input to the transistor 154 and using the latter to control energization of relay RY4, the relay cannot be energized when the time delay interval expires unless the phase angle between the alternator and line voltages has remained below the predetermined low value and has less than a predetermined low rate of change. This assures that if for any reason there is some disturbance either in the distribution system or in the control system during the time delay interval, the relay RY4 will not be actuated until proper phase and frequency match conditions are reestablished.

In response to the operation of the relay RY4, the circuit breaker 16 is caused to close. For this purpose, normally open relay contacts RY4a are connected in series with an auxiliary relay Rx across a suitable voltage source, here shown as a battery 158. When the contacts R4a close, therefore, the auxiliary relay Rx is energized and its normally open contacts Rxa close so as to energize the coil 16d of the circuit breaker 16. Accordingly, the armature associated with the circuit breaker coil shifts to the left as illustrated in FIG. 2, thereby closing the circuit breaker contacts 16a–c. Simultaneously, a spring-biased latch pin 160 snaps behind a latch plate 161 carried by the armature, holding the latter in a closed position against the bias of a compression spring 162. The alternator 15 has now been connected to the distribution line and is ready to supply electrical energy to the distribution system. It may be noted that whenever it is desired to disconnect the alternator 15 from the line, energizing current may be applied to a trip coil 164, thereby retracting the latch pin 160 against the bias of a compression spring 165, so that the spring 162 restores the circuit breaker armature to its open position.

It is a desirable objective to assure that when the circuit breaker 16 is once closed, it remains closed without continued energization of its coil 16d and without continued energization of the relay coil Rx. Such continued energization not only causes undue heating in these coils, but might also interfere with proper opening of the circuit breaker in response to energization of the trip coil 164. Accordingly, provision is here made to assure that the relay RY4 is deenergized so that the relay Rx and the circuit breaker coil 16b are deenergized once the circuit breaker 16 has been closed and latched.

For this purpose, normally open relay contacts RY4b are employed in the breaker operator 149, being connected between the lines L5 and L4 through resistors 168 and 169. A silicon controlled rectifier 170 has its anode connected through a resistor 171 to the line L5 and its cathode connected to the line L4, this rectifier being non-conductive until a positive firing potential appears on its gate 170a. As here shown, a capacitor 172 is connected in parallel with the resistor 169 and to the gate-cathode junction of the rectifier 170. When the relay contacts RY4b close, the capacitor 172 is charged by current flow through the resistor 168 with a time constant that causes the gate 170a to reach a critical firing potential after a short time delay (e.g., two or there seconds). When the gate 170a reaches the critical firing potential, the silicon controlled rectifier 170 is fired, and it conducts a current through the resistor 151, thereby reducing the voltage on the line L5 to such a low value that the relay RY4 drops out. By this arrangement, therefore, the relay RY4 is only momentarily energized for sufficiently long periods to permit the circuit breaker 16 to close, and that relay then drops out to deenergize both the auxiliary relay Rx and the circuit breaker coil 16d. The silicon controlled rectifier 170 when once fired remains conductive so that the relay RY4 cannot be energized a second time. When the alternator is disconnected from the line and shut down, the breaker operator is first reset by momentarily opening the normally closed switch 148, thereby to interrupt current flow through the silicon controlled rectifier 170, so that the apparatus is ready for another automatic synchronizing operation.

After the circuit breaker 16 is closed, the alternator rotor is locked by "synchronizing torque" so that it must rotate at a synchronous speed. Moreover, the line and alternator voltages are identical, so that there must be a zero phase angle between them. Thus, after closure of the circuit breaker the frequency error signal $E_{fe}$ is zero; it produces no further effect on the set point adjustor 50 or the motor 85. Moreover, because the speed of the alternator 15 is locked to synchronous speed, the speed voltage $E_{as}$ is now a substantially constant value and serves only as a DC reference signal input to the summing device 21. Finally, the phase signal voltage $E\phi 2$ of the phase comparator 130 is reduced to zero and has no further effect on the summing circuit 21.

In accordance with still another feature of the present invention, provision is made to automatically cause the alternator 15 to deliver a predetermined wattage load to the distribution system after the alternator is connected to the distribution line. Such an arrangement assures that the power load of the alternator is not determined solely by its speed droop characteristic in relation to other generator units supplying power to the line. It permits the desired load to be delivered by the alternator to be predetermined by the setting of an adjustable load set point device, and with the assurance that the predetermined load will automatically be created and maintained on the alternator 15.

For this purpose, the present system includes means for sensing the value of the load on the alternator 15 and for producing a signal which in magnitude corresponds to that load. This load sensor 190 (FIG. 1) is of a type known per se to those skilled in the art. It receives input signals representing the three phase voltages of the alternator and the three phase currents. Referring to FIG. 2, the actual load sensor 190 includes a single phase load sensor Pa comprising a first transformer 191 having a primary winding 191a excited with the voltage of the A' output line of the alternator, and having a center tapped secondary winding 191b. The opposite extremities of the secondary windings are connected through similarly poled diodes 192, 193 to the opposite extremities of resistors 194, 195, the junction of those resistors being returned through the secondary winding 196a of a transformer 196 to the center tap of the secondary winding 191b. The primary winding 196a of the transformer 196 is excited with the output voltage of a current transformer 198 associated with the A' output line of the alternator 15.

This circuit Pa is substantially identical in its organization and operation to the phase sensor 130, described above, except that the input signals thereto represent different quantities. It will be seen that a voltage proportional to the A' phase voltage of the alternator 1 is induced in the two halves of the secondary winding 196b, whereas a voltage proportional to and in agreement in phase angle with the current flowing in the A' output line is induced in the secondary winding 196b. These two voltages are vectorially added and then rectified by the diode 192 so that a DC voltage representative of their vector sum appears across the resistor 194. The same two voltages are vectorially subtracted and rectified by the diode 193 so that a DC voltage representative of their vector difference appears across the resistor 195. The voltages across the resistors 194 and 195 are of opposite polarities, and the sum of these two voltages is proportional to I cos $\theta$, where $\theta$ is the phase angle between the alternator voltage and delivered load current. Because the alternator voltage Ea may validly be assumed to be constant by virtue of voltage regulators (not shown) associated with the alternator, the term I cos is proportional EaI cos $\theta$, and thus is proportional to delivered power in watts. Thus, the load sensing circuit Pa produces an output voltage across resistors 194, 195 which is proportional to the actual wattage load being delivered by the A' phase of the alternator 15.

It will be observed that identical power sensing circuits Pb and Pc are also included in the load sensor 190, the two resistors of each of these three circuits all being connected in series between conductors 200 and 201. The voltage El appearing between these latter conductors is thus the algebraic sum of the individual voltages produced by the single phase power sensors Pa, Pb, Pc and is therefore proportional in magnitude to the real power or wattage load being delivered at any instant by the alternator 15. If the current flow in all three output lines of the alternator is zero, the load signal voltage El will be zero; or if the current flowing in all three of the alternator output lines has a 90° phase angle with respect to the corresponding alternator voltage, the output voltage El will be zero. When, however, current is being delivered by the alternator 15 at a phase angle other than 90°, then the actual load voltage signal El will be proportional in magnitude to the power being delivered, and will have the indicated polarity making the line 200 positive with respect to the line 201.

To convert the load signal El into an actual load signal Eal which is proportional in magnitude but of opposite polarity, two voltage dividers forming a resistor bridge 204 are connected between the lines 200 and 201. As here shown, this bridge is formed by four resistors 205–208, the first two having relatively large values on the order of 10,000 ohms, and the third resistor being 30,000 ohms, and fourth resistor 208 having a smaller value on the order of 5,000 ohms. As a result, the junction of resistors 205 and 206 will reside at a potential which is more negative than the junction of the resistors 207, 208, when the load voltage El has the indicated polarity. These two junctions form the output terminals of the resistance bridge, the first being connected through a normally closed selector switch S1a to a terminal 210, and the second being connected to a point of ground potential. A smoothing capacitor 211 is connected between the terminal 210 and ground so that the DC voltage Eal appearing thereacross with polarity indicated is proportional in magnitude of the actual load being delivered by the alternator 15.

The output of the load sensing circuit 190 is employed in several ways. First, the terminal 210 is connected through the resistor R5 to the adding junction J so that the actual load voltage Eal forms one input to the summing circuit 21. Prior to the closure of the circuit breaker 16 the actual load voltage Eal is, of course, zero. Howver, with the alternator connected to the distribution system and supplying power, the voltage $Eal$ (which is negative in polarity and proportional in magnitude to the alternator load) forms a negative input to the summing circuit 21 and thus gives to the alternator governing system a "droop characteristic." That is, if the alternator were connected to supply an individual load and thus not subjected to synchronizing torque, the speed would be reduced as the load increased. This would occur because as the load on the alternator 21 increased, the voltage $Eal$ would increase in magnitude, thereby making the error signal $Ee$ more negative and tending to close the throttle 18a of the prime mover 18 so that less torque would be applied to the alternator 15. If only a drooping action were imposed on the prime mover 18 and the alternator 15 when the latter is connected to a line served by additional generating units, the load delivered by the alternator to the distribution system would depend upon set point voltage $Es$ as well as upon relative loads supplied by the other generators. However, and as will be noted below, the present arrangement is one in which the load on the alternator is automatically controlled and maintained at a predetermined adjustable value.

The load voltage $El$ produced by the load sensing circuit 190 is also used for the purpose of providing "temporary droop" or "load pulse" action in the control of the prime mover 18. As here shown, the line 200 on which the output voltage $El$ of the load sensing circuit 190 appears is connected through a differentiator 215 formed by a resistor 216 and a capacitor 217 in series, and thence through the resistor R4 to the adding junction J. Whenever the load on the alternator undergoes a sudden increase or decrease, therefore, a temporary positive or negative voltage, here termed the load pulse signal $Elp$, is thus transmitted to the junction J and causes a temporary increase or decrease in the error voltage $Ee$. Accordingly, a sudden change in the alternator load results in an immediate corrective change in the position of the throttle 18a so as to minimize the time required to restore the load back to its original value.

In accordance with the present invention, an adjustable load set point device 220 is provided to produce a load set point signal $Els$ indicative of the predetermined load which the alternator is to deliver after it has been connected to the distribution line. As here shown, such an adjustable load set point device is constituted simply by a resistive potentiometer 221 connected across a suitable voltage source, shown as a battery 222, and having a movable wiper 221a on which appears, relative to ground, the load set point voltage $Els$. Simply by adjusting the wiper up or down either manually or automatically, the value of the load set point voltage $Els$ may be changed.

Provision is made to produce a load error signal which is representative of the difference between the desired load represented by the load set point voltage $Els$ and the actual alternator load represented by the actual load signal $Eal$. For this purpose, a summing circuit 225 is connected to receive as two of its input signals the load set point voltage $Els$ and the actual load voltage $Eal$. The summing circuit 225 is similar in its organization and operation to the summing circuit 21 described above, and it is only necessary here to indicate that the load set point voltage $Els$ is connected through normally open contacts 16e controlled by the circuit breaker 16 and a resistor 226 to an adding junction J'. The actual load signal $Eal$ with the indicated negative polarity is transmitted through a resistor 227 to the junction J', while an output resistor 228 is connected between the junction J' and ground, so that the load error signal $Ele$ agreeable in polarity and corresponding in magnitude to the sense and extent of the load error appears at the junction J'. This load error signal is transmitted through normally open contact 16f (controlled by the circuit breaker 16) and through a normally closed selector switch S1b to the input terminal 51 of the set point adjustor 50.

When the circuit breaker 16 is open, the contacts 16e and 16f are both open, so that the summing circuit 25 is ineffective, and no load error voltage is transmitted to the terminal 51. Rather, that terminal receives only the frequency error signal $Efe$. However, once the circuit breaker 16 is closed, the contacts 16e and 16f are closed, and the frequency error signal $Efe$ is zero. Therefore, the input terminal 51 receives as its only effective input the load error signal $Ele$.

As soon as the circuit breaker 16 closes to connect the alternator 15 to the distribution line 10, the load error voltage $Ele$ is applied to the line 51. Assuming that the load being delivered by the alternator 15 is lower than that desired load respresented by the setting of potentiometer wiper 221a, the load error voltage $Ele$ will be positive in potential and will thus cause the transistor amplifier 52 to energize the relay RY1, thereby closing the contacts RY1a and energizing the motor 85 so that it drives the potentiometer wiper 34a to increase the set point voltage $Esp$. This, in turn, makes the error signal $Ee$ more positive and opens the throttle 18a. While the alternator 15 and 18 will not increase in speed due to synchronizing torque, this opening of the throttle 18a will increase the driving torque applied to the alternator, and therefore increase the load or power delivered by the alternator to the distribution system. As the load increases to the desired value represented by the load set point signal $Els$, the load signal $Eal$ will increase and the load error voltage $Ele$ will diminish in magnitude until it reaches zero, at which time the relay RY1 will be deenergized to stop the motor 85 with the potentiometer wiper 34a at the correct position necessary to cause the prime mover to deliver the desired load to the distribution system. If for any reason during the operation of the alternator its load should decrease below or increase above the desired value, then the error signal $Ele$ will become positive or negative in value and cause either the relay RY1 or the relay RY2 to be energized so that the motor 85 will reposition the wiper 34a and increase or decrease the set point voltage $Esp$ until the alternator is again delivering the desired or predetermined load.

During operation in this manner, the speed signal $Eas$ is substantially constant, and when the set point voltage $Esp$ is increased, the increased error signal $Ee$ will cause the throttle 18a to open and the load delivered by the alternator 15 to increase. However, such an increase in the delivered load will result in the negative actual load voltage $Eal$ increasing in magnitude, and since this signal is now being applied as one input to the summing circuit 21, the corrective action will continue until the actual load voltage $Eal$ has been made sufficiently negative so that it cancels the set point voltage $Esp$ and restores the error voltage $Ee$ to zero. In other words, once the alternator 15 has been connected to the distribution system so that it is subjected to synchronizing torque, the position of the wiper 34a and the magnitude of the set point voltage $Esp$ determines not the speed of the alternator, but rather the load which the alternator delivers.

The present arrangement is characterized especially by the fact that the set point adjustor 50, i.e., the amplifier 52 and the relays therein controlling the motor 85, serve two distinct and useful functions. First, before the circuit breaker is closed, the adjustor 50 responds to the line and alternator frequency sensors 38, 39 and the summing circuit 43 so as to automatically adjust the set point device 24 and bring the alternator 15 to frequency synchronism with the distribution system. However, upon closure of the circuit breaker 16, the set point adjustor 50 responds to the output of the summing circuit 225 and the load error voltage $Ele$ in a manner to automatically bring the alternator load to the predetermined desired value represented by the setting of the load set point device 220.

The load sensor circuit 190 is one which is well known per se to those skilled in the art, and which has been used in many control applications. As explained above, its output voltage is not strictly proportional to delivered wattage ($EI \cos \theta$) but more precisely is proportional to $I \cos \theta$. However, since precision voltage regulators are very effective in maintaining the alternator voltage substantially constant, the term $I \cos \theta$ becomes for all practical purposes proportional to delivered wattage. More importantly, however, it has been found that the individual load sensor circuits Pa, Pb, Pc, and the composite three phase load sensor 190 constituted thereby, do not produce an output voltage Eal which is precisely proportional to the value of $I \cos \theta$ as the phase angle $\theta$ takes on values intermediate 0° and 90°. The reason for this is believed to reside in the fact that as the current power factor becomes lagging or leading, circulating currents flow through the alternator windings. While the three-phase algebraic sum of these currents is zero, they are sensed by the three individual current transformers, such as that shown at 198. In other words, it believed that the three current transformers exemplified by the transformer 198 produce signals which are not perfectly proportional to the effective current flow in the alternator output lines, but rather which represent the algebraic sum of the effective current and any circulating current. This makes the sensed value of current I imprecise and causes the output voltage Eal to deviate slightly from being truly proportional to $I \cos \theta$. It has been found that the discrepancy or error is a function of the phase angle $\theta$, and that it can adversely affect the operation of the load control system herein described.

In order to obviate this difficulty, provision is made to sense the polarity and magnitude of the phase angle between current delivered by the alternator 15 and the voltage generated thereby. A compensating signal is created which is of a polarity and magnitude corresponding to the sine of the phase angle $\theta$. This signal is algebraically combined with the load signal Eal supplied to the summing circuit 225 and to the summing circuit 21 so as to cancel out the inaccuracies in the latter signal.

As shown in FIG. 1, a load sense compensator 235 is excited by connection to the output lines of the alternator 15, and produces a compensating signal Elc which is transmitted to the two summing circuits 21 and 225. As shown in greater detail by FIG. 2, the load sense compensator 235 comprises a center tapped secondary winding 131c associated with a transformer 131 having its primary winding 131a excited with the interphase voltage appearing between the output lines A' and B' of the alternator 15. The secondary winding 131c has its opposite extremities connected through similarly poled diodes 236 and 238 to the opposite extremities of resistors 239 and 240, the junction of the latter resistors being connected through the secondary winding 241b of a transformer 241 to the center tap of the winding 131c. The primary winding 241a of the transformer 241 is excited with the output from a current transformer 242 disposed to respond to current flow in the C' output line of the alternator. Thus, the load sense compensator 235 is constituted by a circuit which is quite similar in its organization and operation to that of the phase angle sensor 130 described in detail above. This type of circuit produces across the series connected output resistors 239, 240 a DC voltage which corresponds in sense and is proportional in magnitude to the cosine of the phase angle between the voltages which are induced in the secondary winding 131c and 241b. Because the voltage induced in the secondary winding 131c is the A'–B' interphase voltage of the alternator 15, and because the voltage induced in the secondary winding 241b represents the current flow in the C' output line, these two voltages will be 90° out of phase when the output voltages and currents of the alternator 15 are in phase. Moreover, these two voltages will be in phase when the output voltages and currents of the alternator 15 are 90 degrees out of phase. Thus, while the circuit produces an output voltage proportional to the $I \cos \phi$ where $\phi$ is the angle between its input voltages, the angle $\phi$ is 90° when the current phase angle is 0°. This makes the output voltage Elc proportional to $I \cos (\theta + 90°)$, i.e., to $I \sin \theta$. The output voltage Elc is, therefore, proportional to the imaginary or reactive power which is being delivered by the alternator 15 and takes on a positive or negative polarity as the phase angle $\theta$ becames positive or negative.

To utilize this compensating voltage Elc, it is transmitted via a normally closed selector switch S1c and a conductor 245 to the summing circuit 225, and through a resistor 246 in the latter to the adding junction J'. Thus, as the phase angle $\theta$ increases from zero and the load sensing circuit 190 has inaccuracies introduced in the magnitude of the load-representing voltage Eal, the load compensating voltage Elc increases in magnitude (and becomes positive or negative depending upon whether the phase angle $\theta$ is lagging or leading). This imparts a correction to the output signal of the adding circuit 225 which substantially cancels the inaccuracies of the load sensing circuit 190. The output voltage Elc of the load sense compensator 225 is also transmitted as an input to the summing circuit 21, and through the resistor R3 in the latter to the adding junction J. Thus, whenever the load sense voltage Eal transmitted through the resistor R5 has inaccuracies therein due to the alternator current being out of phase with the alternator voltage, the load compensating signal Elc algebraically combines with the load signal Eal to cancel or eliminate those inaccuracies. The load sense circuit 190 together with the load compensating circuit 235 produce signals which are algebraically combined with the adding circuits 225 and 21, thereby, causing the apparatus here described to respond more precisely to the true value of real power or kilowatts which are actually being delivered by the alternator 15.

If it should be desired to operate the alternator 15 with isochronous speed control so that it becomes the master frequency standard of a small distribution system, it is only necessary to open the selector switches S1a, S1b, S1c. This totally removes the effect of the load sensing and compensator circuits 190 and 235, so that the throttle 18a is adjusted only in response to the speed and set point signals Eas and Esp to keep the alternator speed constant.

When the alternator 15 and the control system here described are employed to feed power to a relatively large distribution system having several other generating units contributing to the system load, abrupt changes in the total system loads will not cause appreciable variations in the frequency and phase of the distribution line voltage. However, in those applications where the alternator is to be connected to a distribution line for a relatively small system served, for example, by only two or three other alternators, abrupt system load changes may cause the frequency and phase of the distribution line voltage to change appreciably, at least during transient intervals. Under these latter conditions, the line voltage phase sensed by the phase comparator 130 may change by more than 180° relative to the alternator voltage before the "phase locking" action can correctively adjust the throttle 18a, and the phase servo action described above will be unable to hold the alternator voltage phase locked in substantial agreement with the line voltage.

Accordingly, a modification of the invention, illustrated in FIG. 6, may be employed with smaller generating systems. This modified system is the same as that previously described in connection with FIGS. 2A–C, except that the phase angle sensor 130 is omitted, and the breaker operator 149 is replaced by different device 300 which takes into account the closing time of the circuit breaker 16, and energizes the latter at an instant when the phase angle may not be substantially zero. This alternative form of breaker operation is responsive to the rate of change of the phase angle, and energizes the breaker at an instant which, at that rate of change, will result in the breaker contacts closing when the phase angle reaches substantially zero.

Referring to FIG. 6, the phase angle comparator 90 is identical to that previously described and controls the bi-state relay RY3 in the same manner as before. When the relay RY3 is picked-up as the relative phase angle of the alternator and line voltages approaches a predetermined low value with a predetermined low rate of change, it closes its contacts RY3d, thereby connecting a voltage source, there shown as a battery 301, through a resistor 302 across lines L6 and L7. The battery must charge a capacitor 304 by current flow through the resistor 302, thereby creating a time delay before the breaker operator 300 becomes effective.

The operator 300 not only senses the phase angle but also the rate of change of phase angle between the alternator and line voltages. For this purpose, it includes a transformer 305 having the opposite terminals of its primary winding 305a connected to the corresponding distribution line and alternator conductors, here the C and C' conductors. With the contacts 16c open, the C and C' voltages, measured relative to system ground, are vectorially bucked or subtracted in the primary winding 305a. Accordingly, the voltage induced in the secondary winding 305b is an alternating voltage having a frequency corresponding to the "slip" (rate of change of phase) between the alternator and line voltages, and having an amplitude proportional to the phase angle between such voltages. When the two sensed voltages are exactly in phase, the induced voltage in the secondary winding 305b is zero.

The output of the secondary winding 305b is passed through a full wave rectifier 306 so that a D.C. signal Es appears between the conductor 308 and line L7. This signal varies in amplitude between zero volts and, say, +12 volts as the sensed phase angle changes from 0° to 180°, such variation occurring at the "slip" frequency between the sensed C' and C voltages. The signal Es is applied through two resistors 309, 310 to the base of a transistor 311, so that the latter is conductive except during those intervals that the sensed phase angle is within about ±15°. If the phase angle slowly approaches 0° and the signal Es slowly decreases toward zero volts, the transistor 311 will be substantially turned off when the phase angle reaches a predetermined low value. As a result, the potential at the collector of the transistor 311, and at the base of a transistor 312, will rise to make the latter transistor conduct sufficiently to pick-up the relay RY4 connected in its collector circuit. Accordingly, the relay RY4 will energize the circuit breaker 16 in a manner previously described with reference to FIG. 2. The contact RY4b will close, and a silicon controlled rectifier 314 will be fired to thereafter hold the relay RY4 deenergized, as previously described.

In those instances, however, when the "slip" is appreciable (but sufficiently low to permit closing of the circuit breaker, inasmuch as the phase angle comparator 90 has set the bi-state relay RY3), if the relay RY4 should pick up and energize the circuit breaker 16 when the sensed phase angle is less than ±15°, then by the time the breaker contacts actually close the phase angle may have increased to an intolerably large value. Many circuit breakers, for example, have a closing delay of about one-half second. In order to compensate for this breaker closing delay, the present device "anticipates" and actuates the relay RY4 considerably before the sensed phase angle reaches 0°, and by an anticipation period which is in general proportional to the "slip" or rate of change of the sensed phase angle.

To accomplish this, a rate sensing circuit or differentia is made responsive to the slip voltage Es and cooperates with means for energizing the relay RY4 at an instant which precedes the instant of zero phase by an amount which is, in general, proportional to the slip frequency (rate of change of phase). As here shown, the differentiator circuit comprises a capacitor 320 connected to an adjustable wiper 309a on the resistor 309 and connected in series through a resistor 321 to the base of transistor 311. Thus, the capacitor 320 and resistor 321 are in series across resistor 310 and a part of resistor 309. When the sensed phase angle is appreciable, base current through thte transistor 311 creates a voltage drop of the indicated polarity across resistors 309, 310 and the capacitor 320 is charged to a corresponding voltage. If the signal voltage Es now gradually decreases (indicating a low slip frequency) the capacitor 320 will slowly discharge, creating very small voltage drop across the resistor 321 which is insufficient to turn on a transistor 322 whose emitter-base junction is connected across the resistor 321. When, however, the slip frequency is somewhat higher, and the voltage Es decreases more rapidly as the sensed phase angle approaches zero, the voltage drop across resistors 309, 310 decreases more rapidly, and the capacitor 320 discharges more rapidly to create greater current flow through and voltage drop across the resistor 321. This voltage drop of the indicated polarity is sufficient to turn on the transistor 322 so that conduction occurs between its emitter (connected to the base of transistor 312) and its collector (connected to line L7). This substantially shunts the emitter base junction of transistor 311, so the latter is turned off and relay RY4 is actuated.

The greater the slip frequency, the earlier the transistor 322 is made conductive to cause pick-up of the relay RY4. For example, if the slip frequency is 0.3 c.p.s. (the rate of change of the sensed phase angle is 108° per second), then the relay RY3 will be picked up and the breaker coil 16d energized when the relative phase angle is about ±54° and decreasing. Assuming that the circuit breaker 16 has a closing delay such that its contacts 16a–c actualy close one-half second after its coil 16d is energized, the phase angle at that time will be approximately zero. If the slip frequency should be 0.4 c.p.s. (rate of change of phase is 144° per second), then the relay RY3 will be picked up and the breaker coil 16d energized at an instant when the phase angle is about 72° and decreasing. When the breaker contacts close one-half second later, the phase angle will have reached about zero. If the slip frequency is less than .05 c.p.s., then the transistor 322 will not become conductive, but the signal Es will turn off the transistor 311 when the phase angle is about ±15° and decreasing. When the breaker contacts actually close about one-half second later, the phase angle will be less than 10°.

The foregoing numerical figures are given merely by way of example. It will be clear, however, that by this arrangement the breaker coil 16d is energized at an "anticipation" instant which precedes the zero phase instant by a time interval substantially proportional to slip frequency, and that when the breaker contacts actually close, the phase angle will be less than about 15°. Adjustments of the wiper 309a may be made to increase or decrease the time constant with which the capacitor 320 discharges, and thereby to adapt the circuit for proper coaction with circuit breakers having shorter or longer closing delays.

In summary, the present alternator control system is one which automatically senses line and alternator frequencies and adjusts the set point device 24 (FIG. 2) so that the throttle 18a is positioned to bring those frequencies substantially to agreement. As the phase angle φ between the line and alternator voltages comes to a predetermined low value (e.g., 30°), the phase comparator sets the bi-state device or relay RY3, the later renders the phase angle sensor 130 effective on the summing circuit 21 so that the throttle 18a is given small adjustments to reduce and lock the phase angle at a predetermined low value (e.g., less than 10°). After a time delay from the instant that the relay RY3 is set, and during which the phase locking action transpires, the breaker operator 149 energizes the circuit breaker coil. The breaker closing delay is unimportant, for during such delay the phase servo system holds the alternator and line voltage phase angle locked at a low value. Once the circuit breaker closes, the load sensor 190 supplies a droop signal to the summing circuit 21, and the load sensor 190 together with the set point device 220 and summing circuit 225 cause the adjustor 50 to be correctively set until the desired load (represented by the setting of the set point device 220) is produced and maintained by the alternator. Thus, all functions to automatically synchronize, connect, and adjust the load of the alternator are automatically accomplished. It is only necessary that the prime mover be started-up, and the alternator is then put in service to deliver a desired load. As a convenient way of adapting the present system for remote standby installations, all of the operating voltage sources here shown in FIGURE 2 as batteries may be constituted by rectifying DC power supplies energized from the generated AC voltage of the alternator 15. In this way, none of the control circuits here described is effective until the prime mover is started and brought partially up to speed.

The embodiment of FIG. 6 is like that of FIG. 2, except that the "phase locking" is not employed, and the correct instant for energizing the breaker coil is "anticipated" on the basis of sensed rate of change of phase, so that the breaker contacts close at an instant when the relative phase angle is less than an acceptable small value.

I claim as my invention:

1. In a control system for an alternator connectable by a circuit breaker to a synchronous distribution line, said alternator being driven by a prime mover responsive to a throttle control signal, the combination comprising a summing device for producing an error signal representative of the algebraic sum of input signals applied thereto, means responsive to said error signal for correctively changing the throttle control signal to reduce the error signal to zero, an adjustable set point device for supplying a set point signal as one input to said summing device, power means for adjusting said set point device to increase or decrease the set point signal, means for energizing said power means to readjust said set point device until the frequencies of the alternator and line voltages are substantially equal, means for setting a bi-state device when the relative phase angle between the alternator and line voltages reaches a predetermined low value with a predetermined low rate of change, means responsive to setting of said bi-state device for applying to said summing device a signal which in magnitude and polarity represents the extent and sense of the relative phase angle between the alternator and line voltages, means effective after a predetermined time delay from the instant said bi-state device is set for energizing said circuit breaker, means for creating a load error signal which in magnitude and polarity corresponds to the extent and sense of the difference between the actual load on the alternator and desired load, and means rendered effective upon actuation of the circuit breaker and responsive to said load error signal for correctively energizing said power means until the load error signal is reduced substantially to zero.

2. In a control system for an alternator connectable by a circuit breaker to a synchronous distribution line, said alternator being driven by a prime mover having an adjustable throttle, the combination comprising a speed governor for controlling the throttle in accordance with an error signal, a summing device for producing an error signal representative of the algebraic sum of input signals applied thereto, means for supplying as one input to said summing device a signal representing the actual speed of the alternator, an adjustable set point device for supplying a set point signal as another input to said summing device, power means for adjusting said set point device to increase or decrease the set point signal, means responsive to the alternator frequency and the line frequency for correctively energizing said power means until such frequencies are substantially equal, a bi-state device, comparator means responsive to the alternator voltage and line voltage for setting said bi-state device when the relative phase angle between such voltages reaches a predetermined low value with a predetermined low rate of change, means effective only when said bi-state device is set for applying to said summing device a signal which in magnitude and polarity corresponds to the extent and sense of the relative phase angle between the alternator voltage and line voltage, means effective after a predetermined time delay from the instant said bi-state device is set for energizing said circuit breaker when the said relative phase angle next reaches a predetermined low value with a predetermined low rate of change, means for creating a load error signal which in magnitude and polarity corresponds to the extent and sense of the difference between the actual load on the alternator and desired load, and means rendered effective upon actuation of the circuit breaker and responsive to said load error signal for correctively energizing said power means to readjust said set point device until the load error signal is reduced substantially to zero.

3. In a control system for an alternator connectable by a circuit breaker to an energized AC distribution line, said alternator being driven by a prime mover having an adjustable throttle, the combination comprising a throttle control including means responsive to an error signal of one polarity or the other for moving the throttle in an opening or closing direction, a summing device including means for supplying to said throttle control an error signal indicative of the algebraic sum of input signals applied thereto, an adjustable set point device for supplying as one input to said summing device a set point signal, means for applying as another input to said summing device a speed signal representing the actual speed of said alternator so that said throttle is adjusted until the speed error is substantially zero, power means for adjusting said set point device and the value of the set point signal produced thereby, adjustor control means responsive to the polarity of an input signal thereto for energizing said power means in one sense or the other, means for applying as an input to said adjustor control means a signal representative of the difference between the frequency of said alternator and the frequency of said line so that the throttle is adjusted until such frequencies are matched, means for producing a phase signal which by its polarity and magnitude is representative of the sense and extent of the relative phase angle between the alternator and line voltages, comparator means responsive to such phase angle reaching a predetermined low value with a predetermined low rate of change for supplying said phase angle signal as one input into said summing device so that the throttle is adjusted to automatically maintain the relative phase angle below said predetermined low value, means effective only after a delay from the instant of operation of said comparator means for energizing said circuit breaker when said relative phase angle reaches a predetermined low value with a predetermined low rate of change, an adjustable load set point device, means for producing a load error signal indicative of the difference between the actual load on the alternator and the setting of the load set point device, and means effective when said circuit breaker is closed for applying said load error signal as an input signal both to said adjustor control means and to said summing means.

4. In a control system for an alternator driven by a throttle-controlled prime mover and adapted to be connected to and disconnected from an AC distribution line, the combination comprising means responsive to an error signal of one polarity or the other for moving the throttle in an opening or closing direction, means for producing a speed signal which varies as the actual speed of said prime mover, means for producing an adjustable set point signal, a summing device for producing an error signal generally proportional to the algebric sum of input signals applied thereto, means for applying said speed signal and said set point signal in bucking relation to said summing device thereby to cause the actual speed to be matched to the set point in the absence of synchronizing torque on said alternator, means for sensing the frequency of the distribution line and the frequency of said alternator to derive a frequency error signal indicative by its polarity and magnitude of the sense and extent of the difference in said frequencies, power means for adjusting said set point signal producing means, control means responsive to the polarity of an input signal applied thereto for energizing said power means in a corresponding direction, means for applying said frequency error signal as an input signal to said control means thereby to cause adjustment of the throttle until the two frequencies are substantially matched, means connected to receive the line voltage and the alternator voltage to produce a first phase signal when the relative phase angle between such voltages approaches zero degrees with a predetermined low rate of change, a bi-state device, means responsive to said first phase signal for setting said bi-state device, means for sensing the line voltage and the alternator voltage to produce a second phase signal which by its magnitude and polarity is representative of the extent and sense of the relative phase angle between said voltages, means responsive to setting of said bi-state device for applying said second phase signal to said summing device thereby to effect adjustments of the throttle to maintain the relative phase angle less than a predetermined value, means responsive to said first phase signal only after a lapse of time following the setting of said bi-state device for connecting said alternator to said line, means for producing an actual load signal substantially proportional to the power delivered by said alternator, means for producing an adjustable signal representative of a desired alternator load, means for creating a load error signal representing the difference between said actual load signal and said desired load signal, and means effective only when said alternator is connected to the line for applying said load error signal as an input signal both to said control means and said summing device so that the throttle is correctively adjusted until the load error signal is reduced substantially to zero.

5. In a control system for an alternator driven by a throttle-controlled prime mover and associated with a circuit breaker for connecting the alternator to an AC distribution line, the combination comprising means responsive to an error voltage of one polarity or the other for moving the throttle in an opening or closing direction, means for producing a speed voltage which varies as the actual speed of said prime mover, a set point device including means for producing an adjustable set point voltage, a summing circuit for producing an error signal proportional to the algebraic sum of input voltages applied thereto, means for applying said speed signal and said set point signal in bucking relation to said summing circuit thereby to cause the actual alternator speed to be matched to the set point in the absence of synchronizing torque on said alternator, first and second saturable transformers respectively excited by the alternator and line voltages, means for rectifying the outputs of said transformers to produce two DC voltages respectively proportional to the alternator and line frequencies, means for comparing said two DC voltages to produce a frequency error voltage indicative by its polarity and magnitude of the sense and extent of the difference in said frequencies, a reversible motor connected to adjust said set point device, adjustor control means including a snap-acting amplifier responsive to the polarity of an input voltage applied thereto for energizing said motor in a corresponding direction, means for applying said frequency error voltage as an input signal to said control means thereby to cause adjustment of the throttle until the two frequencies are substantially matched, means for producing first and second constant area pulses at zero-crossings of the alternator and line voltages, means for bucking the like-polarity first and second pulses and rectifying the resultant voltage to produce a first phase voltage which decreases as the relative phase angle between the alternator and line voltages decreases below a predetermined value, means responsive to said first phase voltage falling to a predetermined low value for setting a bi-state device, means for sensing the line voltage and the alternator voltage to produce a second phase signal which by its magnitude and polarity represents the extent and sense of the relative phase angle between such voltages, means responsive to setting of said bi-state device for applying said second phase voltage to said summing circuit thereby to effect adjustments of the throttle to reduce and hold the relative phase angle at a predetermined low value, means effective only after a lapse of time following the setting of said bi-state device for actuating the circuit breaker, means for producing an actual load voltage substantially proportional to the power delivered by said alternator, means for producing an adjustable voltage representative of a desired alternator load, means for creating a load error voltage representing the difference between said actual load voltage and said desired load voltage, and means effective only when said alternator is connected to the line for applying said load error voltage as an input signal both to said summing circuit and to said control means so that the throttle is correctively adjusted until the load error voltage is reduced substantially to zero.

6. In a system for bringing an alternator voltage into synchronism with the voltage on an AC distribution line, the alternator being driven by a prime mover having a movable throttle, the combination comprising a summing device for producing an error signal representative of the algebraic sum of input signals supplied thereto, an adjustable device including means for supplying as one input to said summing device variable set point signal, means for supplying as a second input to said summing device a speed signal proportional to the actual speed of the alternator, control means connected to receive said error signal for adjusting the throttle position to keep said error signal reduced substantially to zero, means responsive to the alternator and line voltages for producing a frequency error signal proportional to the difference in the frequencies of such voltages, power means for adjusting said adjustable device in one sense or the other to increase or decrease said set point signal, and means responsive to said frequency error signal increasing above or decreasing below zero for energizing said power means in one sense or the other, thereby to cause corrective changes in the speed of the alternator until the alternator and line frequencies are substantially equal.

7. In a system for bringing the speed of an alternator into synchronism with the frequency of an AC distribution line, the alternator being driven by a prime mover having an adjustable throttle, the combination comprising a summing circuit including means for producing an error voltage representative of the algebraic sum of the input voltages supplied thereto, a throttle control connected to receive said error voltage and including means for adjusting the throttle according to the sense of the error voltage, means for producing a speed voltage which in magnitude is indicative of the actual speed of the alternator, an adjustable set point device for producing a variable set point voltage, means for supplying said speed and set point voltages as opposing first and second inputs to said summing circuit, two saturable pulse transformers having primary windings respectively excited with the alternator and line voltages and each having a secondary winding, two rectifiers each having its input connected to one of said secondary windings, two smoothing filters respectively connected to the outputs of said rectifiers and producing two DC voltages respectively proportional in magnitude to the alternator and line frequencies, means responsive to said DC voltages for producing a frequency error voltage corresponding in polarity to the sense of the difference between said frequencies, power means for adjusting said set point device, and adjustor means connected to receive said frequency error voltage for energizing said power means in one sense or the other when the frequency error-voltage is of one polarity or the other, whereby said set point signal is varied to change the speed of said alternator until said frequencies are made substantially equal.

8. In a system for closing a circuit breaker to connect an alternator to a synchronous distribution line, the alternator being driven by a prime mover responsive to a throttle control signal, the combination comprising a summing device for producing as a throttle control signal an error signal representative of the algebraic sum of input signals applied thereto, means for supplying as first and second inputs to said summing device signals respectively corresponding to the actual speed of said alternator and a set point signal corresponding to a speed which makes the frequencies of the alternator and line voltages substantially equal, means for producing a phase error signal which in polarity and magnitude represents the sense and extent of the relative phase angle between the alternator and line voltages, means for connecting said phase error signal as a third input to said summing device when said relative phase error reaches a predetermined low value and has a predetermined low rate of change so that said error signal is thereafter correctively adjusted to maintain said phase angle below said predetermined low value, and means effective after a predetermined delay from the instant said connecting means operates for energizing the circuit breaker.

9. In a system for closing a circuit breaker to connect an alternator to a synchronous distribution line, the alternator being driven by a prime mover having an adjustable throttle, the combination comprising a speed governor including a summing device for producing an error signal representative of the algebraic sum of input signals applied thereto and means responsive to such error signal for adjusting the throttle position, means for supplying as first and second inputs to said summing device signals respectively corresponding to the actual speed of said alternator and a desired set point speed, means responsive to the alternator and line voltages for producing a phase error signal which in polarity and magnitude corresponds to the sense and extent of the relative phase angle between such voltages, means for connecting said phase error signal as a third input to said summing device when said relative phase error reaches a predetermined low value and has a predetermined low rate of change so that said throttle is thereafter correctively adjusted to maintain said phase angle below said predetermined low value, and means effective only after a predetermined delay from the instant said connecting means operates for energizing the circuit breaker only if said phase angle is no greater than said predetermined value and has a rate of change no greater than said predetermined rate of change.

10. In a system for closing a circuit breaker to connect an alternator to a synchronous distribution line, the alternator being driven by a prime mover having an adjustable throttle, the combination comprising a speed governor including a summing device for producing an error signal representative of the algebraic sum of input signals applied thereto, means responsive to such error signal for adjusting the throttle position, means for producing a set point signal, means for producing a speed signal representative of the actual speed of the alternator, means for applying said set point and speed signals as first and second opposing inputs to said summing device so that adjustment of the set point signal may bring the alternator frequency into substantial equality with the line frequency, means responsive to the alternator and line voltages for signalling when the phase angle between such voltages approaches a predetermined low value at a predetermined low rate of change, a bi-state device, means responsive to said signalling means for actuating said bi-state device when the phase angle is reduced to a predetermined low value and has less than a predetermined low rate of change, means responsive to the alternator and line voltages for producing a phase signal representative in polarity and magnitude to the sense and extent to the phase angle between such voltages, means responsive to actuation of said bi-state device for supplying said phase signal as a third input to said summing device, and means effective after a time delay from the instant of actuation of said bi-state device for energizing the circuit breaker.

11. In a system for closing a circuit breaker to connect an alternator to a synchronous distribution line, the alternator being driven by a prime mover having an adjustable throttle, the combination comprising a speed governor including an electrical summing circuit for producing an error voltage representative of the algebraic sum of input voltages applied thereto, means responsive to such error voltage for adjusting the throttle, means for creating an adjustable set point voltage, means for creating a speed voltage proportional to the actual speed of the alternator, means supplying said set point and speed voltages in opposing relation to said summing device to bring the alternator to a set point speed, means responsive to the alternator voltage for producing first pulses of fixed amplitude and width at the positive-going zero-crossings of that voltage, means responsive to the line voltage for producing second pulses of fixed amplitude and width at the positive-going zero-crossings of that voltage, a rectifier, means for applying said pulses in bucking relation to the input of said rectifier, a smoothing filter connected to the output of said rectifier, a relay and means connecting the same to be actuated when the output of said filter drops below a predetermined level, means responsive to the alternator and line voltages for producing a phase error signal representative in polarity and magnitude of the sense and extent of the phase angle between such voltages, said relay having normally open contacts for connecting said phase error signal as an input to said summing circuit, and means effective after a time delay from the instant of actuation of said relay for energizing the circuit breaker when the output of said filter drops below said predetermined level.

12. In a system for closing a circuit breaker to connect an alternator to a synchronous distribution line, the alternator being driven by a prime mover having an adjustable throttle, the combination comprising a speed governor including an electrical summing circuit for producting an error voltage representative of the algebraic sum of input voltages applied thereto, means responsive to such error voltage for adjusting the throttle, means for creating an adjustable set point voltage, means for creating a speed voltage proportional to the actual speed of the alternator, means supplying said set point and speed voltages in opposing relation to said summing circuit to bring the alternator to a set point speed, a first saturable transformer excited by the alternator voltage for producing first pulses at the positive-going zero-crossings of that voltage, a second saturable transformer excited by the line voltage for producing second pulses at the positive-going zero-crossings of that voltage, two silicon controlled rectifiers respectively receiving said first and second pulses and associated with means to produce constant area pulses at instants corresponding to the first and second pulses, a rectifier, means for applying said constant area pulses in bucking relation to the input of said rectifier, a smoothing filter connected to the output of said rectifier to produce a voltage which falls below a predetermined value only when the phase angle between the alternator and line voltages is less than a predetermined low value and has less than a predetermined low rate of change, a relay and means connecting the same to be actuated when the output voltage of said filter drops below a said predetermined level, means responsive to the alternator and line voltages for producing a phase error signal corresponding in polarity and magnitude to the sine of the phase angle between such voltages, said relay having normally-open contacts for connecting said phase error signal as an input to said summing circuit, a time delay circuit initiated by energization of said relay, and means adapted to energize the circuit breaker after the time delay circuit times out.

13. In a control system for an alternator connected to an A.C. distribution line, the alternator being driven by a prime mover having an adjustable throttle, the combination comprising a first servo loop responsive to a set point signal and an actual load signal representing the actual electrical load being delivered by said alternator for automatically adjusting and maintaining the throttle so that the alternator delivers a load corresponding to the set point signal, and a second servo loop responsive to said actual load signal and to a desired load signal for automatically adjusting the value of said set point signal until the actual load signal and the desired load signal are substantially equal in magnitude.

14. The combination set forth in claim 13 further characterized by means for rendering said second servo loop ineffective when the alternator is disconnected from the distribution line.

15. In a control system for an alternator connectable by a circuit breaker to an A.C. distribution line, the alternator being driven by a prime mover having an adjustable throttle, the combination comprising means for producing a first adjustable set point signal, means for producing a speed signal proportional to the speed of thte alternator, means for producing an actual load signal generally proportional to the wattage delivered by the alternator; means for producing an error signal representative of the algebraic sum of said set point signal, said speed signal, and said load signal; means responsive to said error signal for adjusting the throttle until the error signal is reduced substantially to zero so that when the circuit breaker is open and the alternator unloaded the speed of the alternator is determined by said set point signal, means for producing an adjustable desired load signal, means for producing a load error signal representative of the difference in magnitude of said desired load signal and actual load signal, and means effective when the circuit breaker is closed and responsive to said load error signal for increasing or decreasing said set point signal when the actual load is below or above the desired load value.

16. In a control system for an alternator connected to a distribution line, the alternator being driven by a prime mover having a movable throttle and being locked to a synchronous speed by synchronizing torque, the combination comprising a summing device having means for producing an error signal representative of the algebraic sum of input signals applied thereto, a throttle control including means responsive to said error signal for adjusting the throttle, means for producing an actual load signal which in magnitude corresponds to the wattage load on the alternator, a first adjustable device for producing a variable set point signal, means for applying said load and set point signals as opposing inputs to said summing circuit so that the throttle is adjusted to make the alternator deliver a wattage load corresponding in magnitude to the set point signal, a load set point device for producing a variable load set point signal indicative of a desired alternator load, means responsive to said actual load signal and said load set point signal for producing a load error signal which in polarity corresponds to the sense of the difference between the actual and desired alternator load, and motor means responsive to said load error signal for adjusting said first set point device until the load difference is reduced substantially to zero.

17. In a system for controlling an alternator connectable to an A.C. distribution line, said alternator being driven by a prime mover having an adjustable throttle, the combination comprising a summing device for producing an error signal representative of the algebraic sum of input signals supplied thereto, throttle control means for adjusting the throttle according to the sense and magnitude of said error signal, a first adjustable set point device for producing a variable set point signal, means for sensing the alternator output voltage and current and producing an actual load signal substantially proportional to the load being delivered by the alternator, means for supplying said set point and actual load signals to said summing device so that the throttle is adjusted to keep the alternator load in agreement with the setting of said first set point device, a second adjustable set point device for producing a desired load signal which in magnitude represents a desired alternator load, a second summing device for producing a second error signal indicative of the algebraic sum of said desired load signal and said actual load signal, and power means responsive to the polarity of said second error signal for driving said first set point device in one direction or the other until said second error signal is reduced substantially to zero.

18. In a control system for an alternator connectable by closure of a circuit breaker to an A.C. distribution line, the alternator being driven by a prime mover having an adjustable throttle, the combination comprising a summing device having means for producing an error signal representative of the algebraic sum of input signals supplied thereto, means responsive to said error signal for moving the throttle in one direction or the other, means for producing a speed signal proportional to the actual speed of the alternator, a first adjustable set point device for producing a variable set point signal, means for supplying said speed signal and said set point signal as opposing inputs to said summing device so that with the circuit breaker open the speed of the alternator is determined by the adjustment of said set point device, means for sensing the alternator current and voltage and producing a load signal proportional in magnitude to the power delivered by said alternator, means for supplying said load signal as a third input to said summing device, a second adjustable set point device for producing an adjustable load set point signal, means responsive to said load signal and said load set point signal for producing a load error signal, normally ineffective power means responsive to the polarity of said load error signal for driving said first adjustable set point device in one direction or the other, and means responsive to closure of the circuit breaker for rendering said last-named means effective, thereby automatically to cause the alternator to supply a power load determined by the adjustment of said second adjustable device.

19. In a control system for an alternator connectable to an A.C. distribution line and driven by a prime mover responsive in its speed and torque to a control signal, the combination comprising means for producing a speed signal indicative of actual alternator speed, adjustable means for producing a set point signal, a summing device having means for producing an error signal representative of the algebraic sum of input signals applied thereto, said error signal being adapted for use as a prime mover control signal, means for applying said speed and set point signal as opposing inputs to said summing device, means for producing a frequency error signal representative of the difference between the alternator and line voltage frequencies, adjustor means responsive to said frequency error signal for adjusting said adjustable means to bring said frequency error signal substantially to zero when the alternator is not connected to the line, means for producing a load error signal representative of the difference between the actual load of the alternator and a desired load, and means for applying said load error signal to said adjustor means when the alternator is connected to the line so that the adjustor means changes said set point signal to reduce said load error signal substantially to zero.

20. In a control system for an alternator connectable by closure of a circuit breaker to an A.C. distribution line, the alternator being driven by a prime mover having an adjustable throttle, the combination comprising a summing device having means for producing an error signal representative of the algebraic sum of input signals supplied thereto, means responsive to said error signal for moving the throttle in one direction or the other, means for producing a speed signal proportional to the actual speed of the alternator, a first adjustable set point device for producing a variable set point signal, means for supplying said speed signal and said set point signal as opposing inputs to said summing device so that, with the circuit breaker open, the speed of the alternator is determined by the adjustment of said set point device, means responsive to the alternator and line voltages for producing a frequency error signal which by its polarity and magnitude represents the sense and extent of the difference between the frequencies of such voltages, adjustor means responsive to an input signal of one polarity or the other for adjusting said first set point device to increase or decrease said set point signal, means for applying said frequency error signal as the input to said adjustor means so that the frequency error signal is reduced substantially to zero when the circuit breaker is open, means for sensing the alternator current and voltage and producing a load signal proportional in magnitude to the wattage delivered by said alternator, means for supplying said load signal as a third input to said summing device which opposes said set point signal, a second adjustable set point device for producing an adjustable load set point signal, means responsive to said load signal and said load set point signal for producing a load error signal, and means for applying said load error signal as an input to said adjustor means when the circuit breaker is closed, thereby automatically to cause the alternator to supply a wattage load determined by the adjustment of said second adjustable device.

21. In a control system for an alternator connectable by a circuit breaker to a synchronous distribution line, said alternator being driven by a prime mover having an adjustable throttle, the combination comprising a throttle control including means responsive to an error signal of one polarity or the other for moving the throttle in an opening or closing direction, a summing device including means for supplying to said throttle control an error signal indicative of the algebraic sum of input signals applied thereto, an adjustable set point device for supplying as one input to said summing device a set point signal, means for applying as another input to said summing device a speed signal representing the actual speed of said alternator so that said throttle is adjusted until the speed error is substantially zero, power means for adjuusting said set point device and the value of the set point signal produced thereby, adjustor means responsive to the polarity of an input signal thereto for energizing said power means in one sense or the other, means for applying as an input to said adjustor means a signal representative of the difference between the frequency of said alternator and the frequency of said line so that the throttle is adjusted until such frequencies are substantially matched, an adjustable load set point device, means for producing a load error signal indicative of the difference between the actual load on the alternator and the setting of the load set point device, and means effective when the circuit breaker is closed for applying said load error signal as an input signal both to said summing device and said adjustor means so that the throttle is adjusted until the load error is substantially zero.

22. The combination set forth in claim 4, further characterized in that said means for producing an actual load signal comprises means excited by the alternator voltage and current for producing a first voltage signal generally but not perfectly proportional to $I \cos \phi$ where $I$ is the delivered alternator current and $\phi$ is the phase angle between the alternator current and voltage, means excited by the alternator voltage and current for producing a compensating voltage signal generally proportional to $I \sin \phi$, and means for algebraically combining said first voltage with said compensating voltage to create the effective actual load signal.

23. The combination set forth in claim 17, further characterized in that said means for producing said actual load signal includes first means for producing a first signal generally proportional to $I \cos \phi$ where $I$ is the delivered alternator current and $\phi$ is the phase angle between the alternator current and voltage, and second means for producing a compensating voltage generally proportional to $I \sin \phi$, and further characterized in that said first signal, compensating signal, and actual load signal are supplied as inputs to said second summing device, and said set point, first signal and second signal are applied as inputs to said first summing device.

24. The combination set forth in claim 18 and characterized in that said means for producing an actual load signal includes means for producing a first signal generally proportional to $I \cos \phi$ where $I$ is the delivered alternator current and $\phi$ is the current phase angle, means for producing a compensating signal generally proportional to $I \sin \phi$, and means effectively algebraically combining said first and compensating signals to create said actual load signal.

25. In a system for closing a circuit breaker to connect an alternator to a synchronous distribution line, the alternator being driven by a prime mover having an adjustable throttle, the combination comprising a speed governor including a summing device for producing an error signal representative of the algebraic sum of input signals applied thereto, and means responsive to such error signal for adjusting the throttle position, means for producing a set point signal, means for producing a speed signal representative of the actual speed of the alternator, means for applying said set point and speed signals as first and second opposing inputs to said summing device so that adjustment of the set point signal may bring the alternator frequency into substantial equality with the line frequency, means responsive to the alternator and line voltages for producing a first phase signal when the phase angle between such voltages falls to a first predetermined low value with a predetermined low rate of change, a bi-state device, means responsive to said first phase signal for actuating said bi-state device when the phase angle is reduced to said first predetermined low value and has less than a predetermined low rate of change, means responsive to the alternator and line voltages for producing a second phase signal which varies in magnitude according to the phase angle between such voltages and at a rate corresponding to the slip frequency of such voltages, means rendered effective only after said bi-state device is set for energizing the circuit breaker when said second phase signal falls below a critical value, and an auxiliary anticipating means effective only after said bi-state device is set for energizing the circuit breaker prior to the instant at which said second phase angle falls below the critical voltage by an interval which is directly related to the slip frequency.

26. In a system for closing a circuit breaker to connect an alternator to a synchronous distribution line, the combination comprising a phase comparator for signalling when the phase angle between the alternator and line voltages falls below a first predetermined value with less than a predetermined rate of change, a bi-state device connected to be set in response to such signalling, first means rendered effective when the bi-state device is set for producing a breaker energization signal when the said phase angle falls below a second predetermined value, and second means rendered effective when said bi-state device is set for producing a breaker energization signal prior to the instant at which said phase angle falls below said second value by an interval which is related to the rate of change of said phase angle whereby the circuit breaker may be energized as a result of the operation of said first means in the event that it is not earlier energized as a result of the operation of said second means.

27. In a system for closing a circuit breaker to connect an alternator to an energized AC line, the combination comprising means for signalling when the phase angle between the alternator and line voltage has less than a predetermined rate of change, and a normally disabled circuit means which when enabled is responsive to an actuating signal to energize a circuit breaker, means responsive to signalling by said signalling means for enabling said circuit means, means for producing a phase-representing signal which varies according to the instantaneous value of said phase angle, first means responsive to said phase-representing signal for supplying an actuating signal to said circuit means at the instant said phase angle falls below a predetermined small value, and second means responsive to said phase-representing signal for supplying an actuating signal to said circuit means at an instant which precedes the instant of zero phase angle by an interval related to the rate of change of said phase angle.

28. In a system for closing a circuit breaker to connect an alternator to an energized AC line after the slip frequency between the alternator and line voltages has been reduced to a predetermined low value, the combination comprising means for producing a first DC voltage which varies in accordance with the phase angle between the alternator and line voltages and at a rate related to the slip frequency, means for applying said first DC voltage to the emitter-base circuit of a transistor, means controlled by said transistor to produce a breaker energization signal when said first DC voltage falls below a predetermined value, means for producing a second DC voltage which has a given polarity and varies according to the rate of change of said first voltage when the latter is decreasing, and means controlled by said second voltage reaching a given magnitude for independently reducing the emitter-base voltage of said transistor to cause the latter to actuate the energization signal producing means.

References Cited

UNITED STATES PATENTS

| | | | |
|---|---|---|---|
| 2,689,919 | 9/1954 | Lytle | 307—87 |
| 2,781,457 | 2/1957 | Urban | 307—87 |
| 3,210,556 | 10/1965 | Billings | 307—87 |
| 3,226,561 | 12/1965 | Taniai | 307—87 |
| 3,244,898 | 4/1966 | Hickox | 290—2 |

ORIS L. RADER, *Primary Examiner.*

G. SIMMONS, *Assistant Examiner.*